(12) United States Patent
Kamada et al.

(10) Patent No.: US 7,853,495 B2
(45) Date of Patent: Dec. 14, 2010

(54) USAGE PERIOD MANAGEMENT SYSTEM FOR APPLICATIONS

(75) Inventors: Tomihisa Kamada, Tokyo (JP); Atsushi Murakami, Yokohama (JP); Masaaki Ejima, Funabashi (JP)

(73) Assignee: Access Co., Ltd., Chiyoda-ku, Tokyo (JP)

( * ) Notice: Subject to any disclaimer, the term of this patent is extended or adjusted under 35 U.S.C. 154(b) by 1594 days.

(21) Appl. No.: 10/499,866

(22) PCT Filed: Dec. 27, 2002

(86) PCT No.: PCT/JP02/13878

§ 371 (c)(1), (2), (4) Date: Oct. 12, 2004

(87) PCT Pub. No.: WO03/058410

PCT Pub. Date: Jul. 17, 2003

(65) Prior Publication Data

US 2005/0044191 A1    Feb. 24, 2005

(30) Foreign Application Priority Data

Dec. 28, 2001    (JP)    ............................. 2001-400291

(51) Int. Cl.
*G06F 15/22* (2006.01)
*G06F 21/00* (2006.01)
*G06F 7/04* (2006.01)

(52) U.S. Cl. ................................ 705/32; 705/59; 726/7

(58) Field of Classification Search ........................ None
See application file for complete search history.

(56) References Cited

U.S. PATENT DOCUMENTS

| 5,933,498 | A | 8/1999 | Schneck et al. | |
|---|---|---|---|---|
| 7,155,415 | B2 * | 12/2006 | Russell et al. | 705/59 |
| 7,272,859 | B2 * | 9/2007 | Kuriya et al. | 726/29 |
| 2002/0082087 | A1 * | 6/2002 | Kuroda | 463/42 |
| 2002/0091584 | A1 * | 7/2002 | Clark et al. | 705/26 |
| 2002/0123336 | A1 | 9/2002 | Kamada | |
| 2003/0005427 | A1 * | 1/2003 | Herrero | 717/178 |

(Continued)

FOREIGN PATENT DOCUMENTS

EP    0809221    A2    11/1997

(Continued)

OTHER PUBLICATIONS

Japanese Office Action mailed Jan. 8, 2009, for Japan Application No. P2002-371701 filed Dec. 24, 2002, 3 pages. (English translation attached, 2 pages).

*Primary Examiner*—Michael J Yigdall
*Assistant Examiner*—Ben C Wang
(74) *Attorney, Agent, or Firm*—Morrison & Foerster LLP

(57) ABSTRACT

A method of managing downloading contents in a network system including a terminal device, a management server and a downloading site includes three phases of procedures. In a first phase procedure, the management server receives a request for downloading contents from the terminal device and performs a predetermined registration operation. In a second phase procedure, the management server transmits attribution data corresponding to the contents to be downloaded by the terminal device, the attribution data including information of the downloading site. In a third phase procedure, the terminal device accessed the downloading site in accordance with the information included in the attribution data and downloads the contents.

48 Claims, 32 Drawing Sheets

U.S. PATENT DOCUMENTS

| | | |
|---|---|---|
| 2003/0028454 A1* | 2/2003 | Ooho et al. .................... 705/32 |
| 2003/0032406 A1 | 2/2003 | Minear et al. |
| 2004/0015961 A1* | 1/2004 | Chefalas et al. ............. 717/178 |
| 2004/0043753 A1 | 3/2004 | Wake et al. |

FOREIGN PATENT DOCUMENTS

| | | |
|---|---|---|
| JP | 03-062222 A | 3/1991 |
| JP | 05-197542 A | 8/1993 |
| JP | 10-111856 A | 4/1998 |
| JP | 10-222579 A | 8/1998 |
| WO | WO-00/33221 | 6/2000 |
| WO | WO-00/79452 | 12/2000 |
| WO | WO-01/78303 | 10/2001 |
| WO | WO02/03199 A1 | 1/2002 |

* cited by examiner

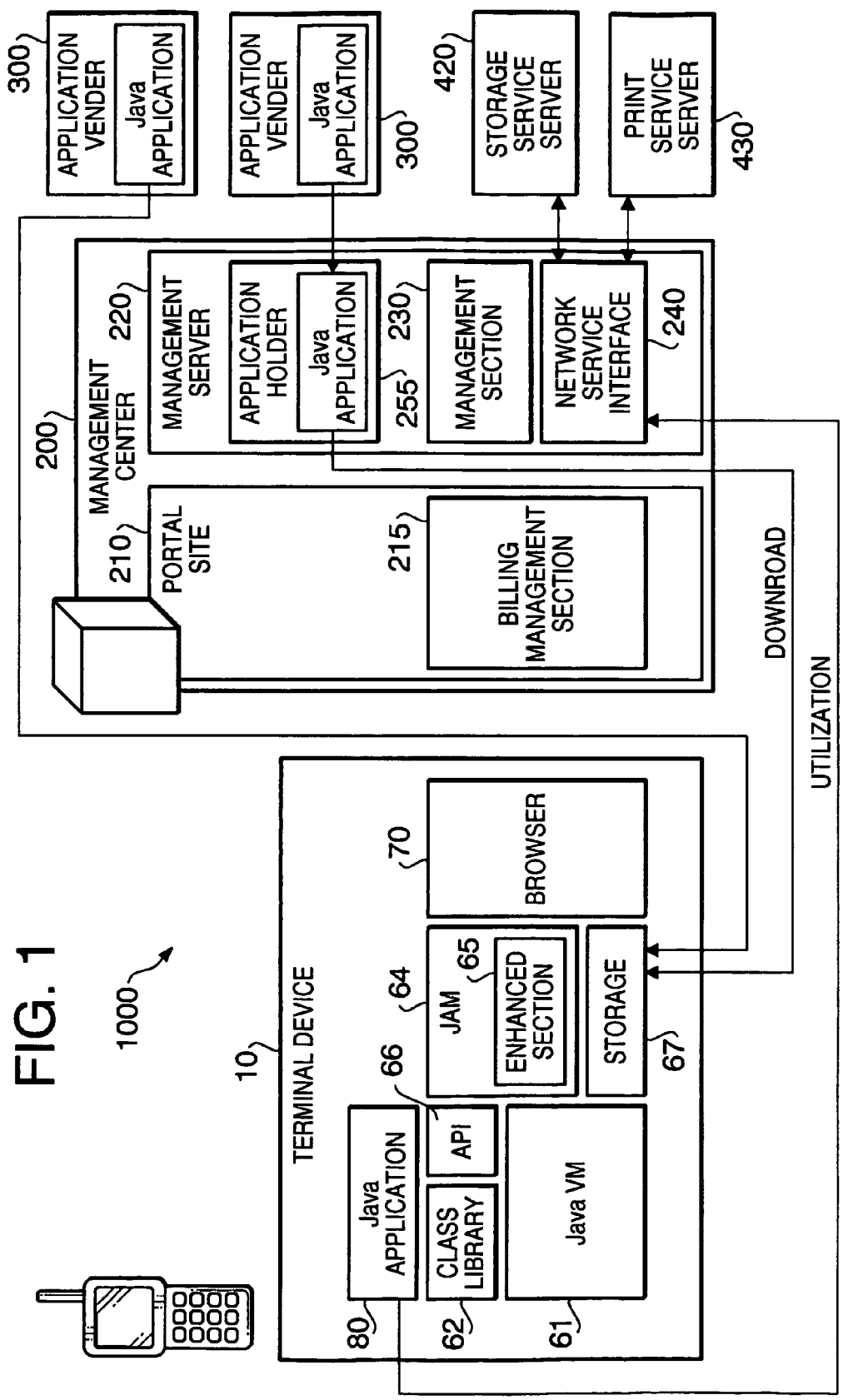

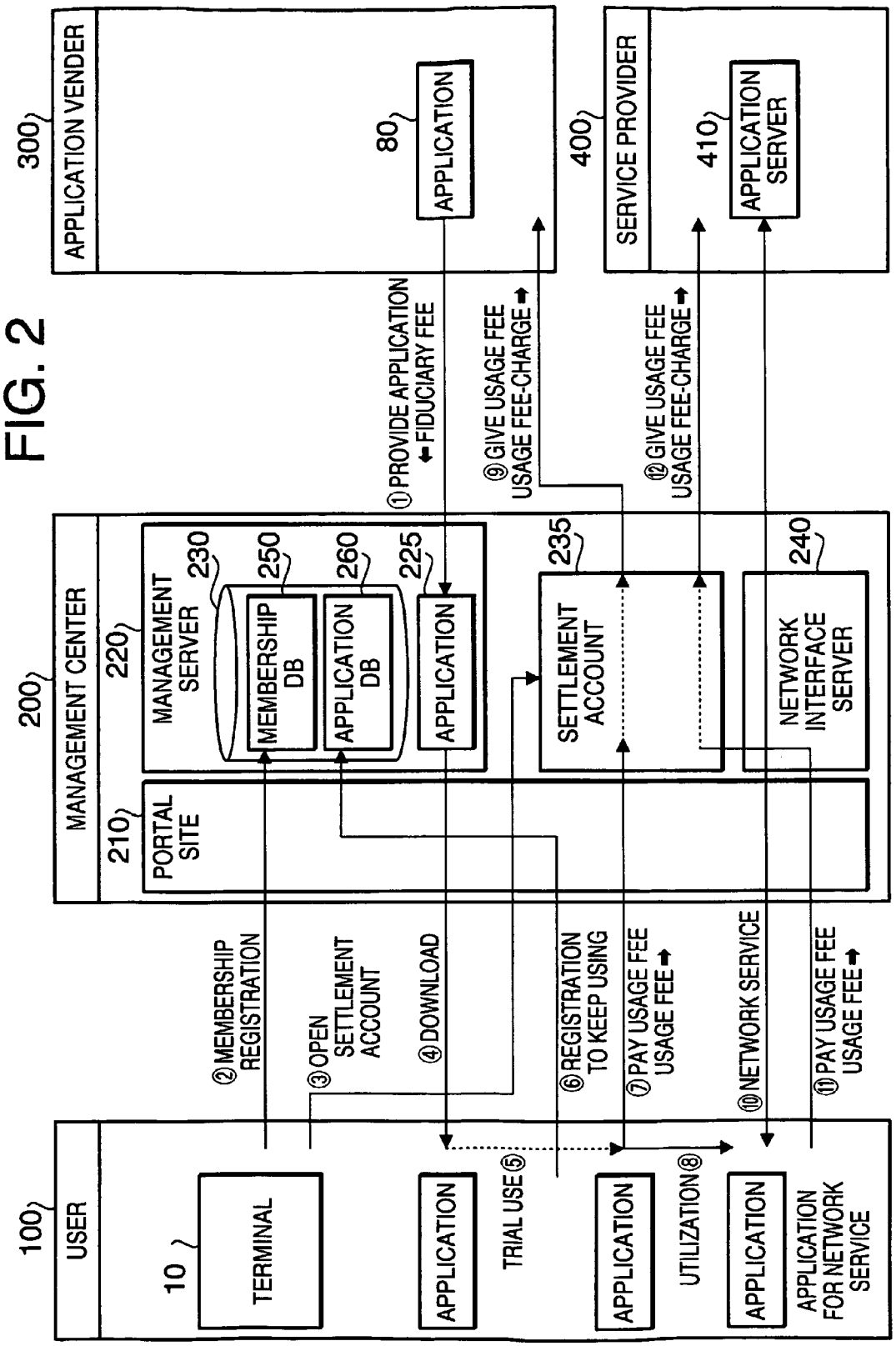

FIG. 3A FUNDAMENTAL MODEL
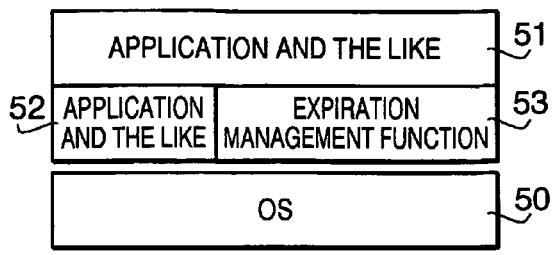
FIG. 3B1    FIG. 3B2    FIG. 3B3
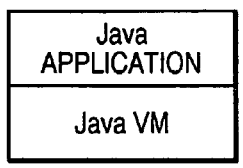 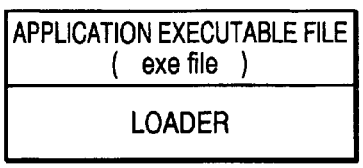 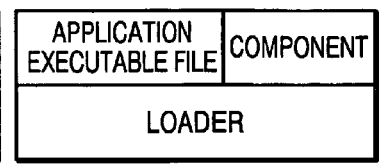
FIG. 3C
FIG. 3D
FIG. 3E
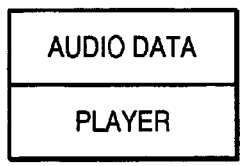
FIG. 3F
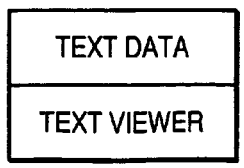

55 AFD Information

- Name :
- Revision :
- Vender ID :
- application URL
- Size of the application :
- Extension-Version :
- Expiration-Time :
- Lease Period
- Code-Signing :
  ⋮
- Screensize :

FIG. 7

Membership registration

Services are unavailable unless membership registration is performed.

"Membership registration"

If you are registered user who intends to register a new terminal device or intends to recover the broken terminal, "Click here"

Cancel

FIG.10A

| | |
|---|---|
| user name | Taro Yamada |
| password | **** |
| password | **** |
| e-mail address | taro@•••• |
| telno | 03-5678-1234 |
| BIRTHDAY | 1980 |
| | JAN 01 |
| ADDRESS | TOKYO |
| SEX | ⊙male ○female |
| Terminal name | Tama |

Cancel | Registration

FIG.10B

Membership registration is completed. your membership ID is 00000008.

Settlement account is opened. The balance on Your account is 0 yen. Please reload electronic memory.

Next

FIG.10C

Registration is fully completed. The services are available.

To log in screen

Your member information membership ID [****]
password [****]

[Return] [Next]

FIG.11B

Addition of the terminal device
or recovery of the terminal device ?

"Addition of the terminal device"
"Recovery of the terminal"

[Return]

FIG.11C

Input screen of new name
of the terminal device

Please input new name
[        ]

[Return] [Next]

FIG.11D

Registration is completed.

Optimizing the terminal now.
Please wait.

[Next]

FIG.11E

Please select a terminal.

| Model | Name |
|---|---|
| xxPDA | tanpopo |
| xxPDA | tama |

[Return]

FIG.11F

Terminal recovery is completed.

Optimizing the terminal now.
Please wait.

[Next]

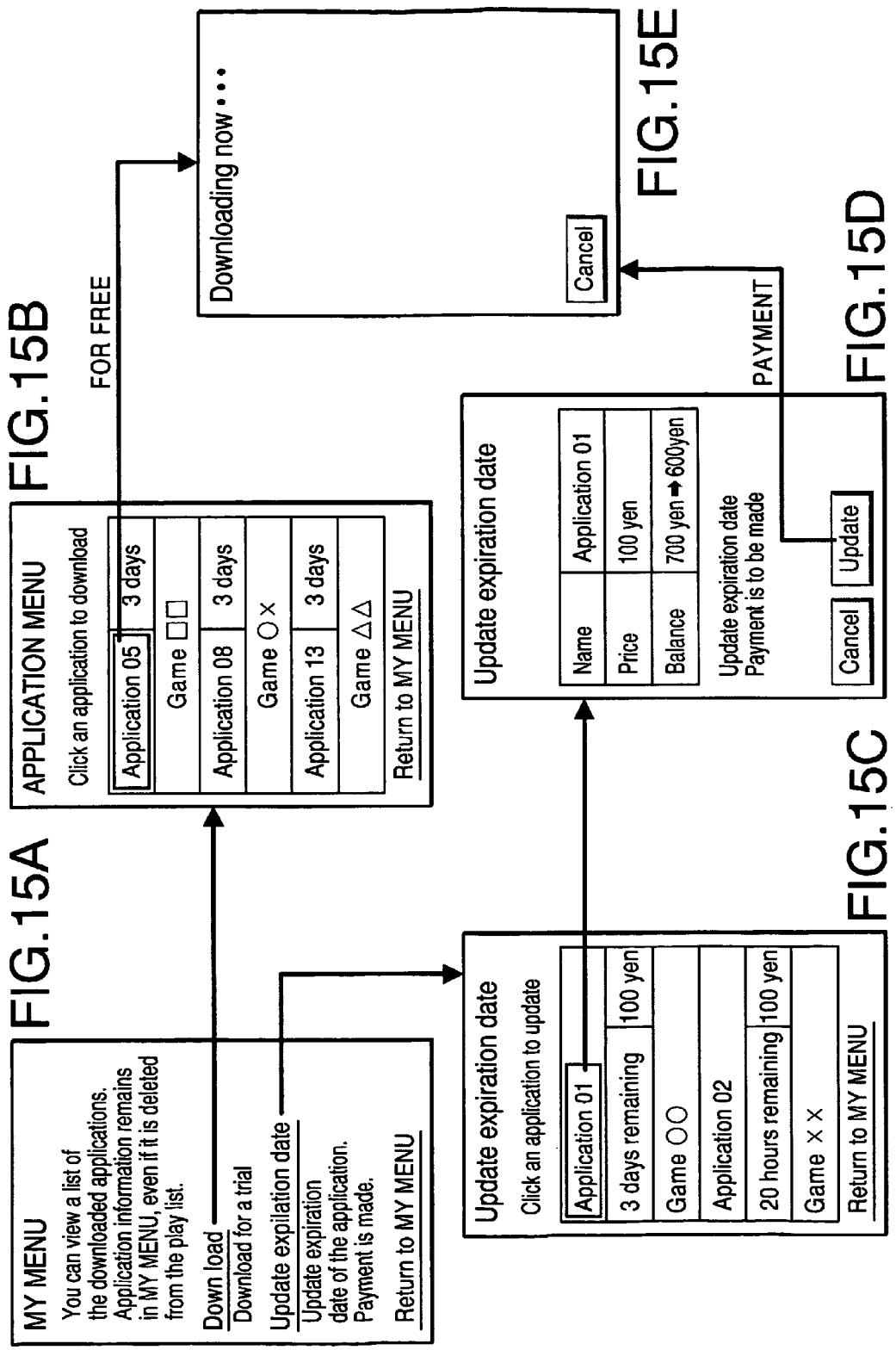

FIG.20A
Play list

| Play list | | | |
|---|---|---|---|
| Obtain the latest | Information | delete | |

All Information
AP Information
~~Application 1~~
Application 2
Application 3
Application 4
Application 5 file

FIG.20B
All Information

| All Information | | | |
|---|---|---|---|
| Obtain the latest | Information | delete | |

Start-up | Terminal

Member ID : △△△△

Type ID : ××PDA

Name : ☆☆☆ file

FIG.20C
AP Information

AP Information :Application 3

| Obtain the latest | Information | delete | |
|---|---|---|---|

Detail | Usable period

AP Name : Application 3

Version : 201

Size : 100K file

FIG.20D
AP Information

AP Information :Application 3

| Obtain the latest | Information | delete | |
|---|---|---|---|

AP Information | Usable period

Expiration date : 01/12/31 file

USAGE PERIOD MANAGEMENT SYSTEM FOR APPLICATIONS

FIELD OF THE INVENTION

The present invention relates to a system for providing application programs, image data or the like (hereinafter referred to as contents) through a network such as the Internet, and particularly to an expiration date management system for such a contents providing system.

BACKGROUND OF THE INVENTION

Recently, in association with developments of Internet related techniques and/or mobile communication techniques, electrical commerce making use of cell phones, PDA (Personal Digital Assistance), and the like have been widespread.

For example, a system allowing a user to download application programs for a PDA through a computer network and to use the programs or the like, for free of charge or for value, within a predetermined period have been considered.

There has been suggested a method for restricting the usage period of the downloaded contents. An example of such a means is disclosed in Japanese Patent Provisional Publication No. HEI 10-222579. According to the publication, a restrict means known as "time bomb" is incorporated in the application, which restricts the usage of the application when the allowed time period has expired. The usage period is typically determined by counting the period since the date and time, which are obtained from the clock of the PDA, when the application is installed in the PDA.

Another method is suggested, in which a counter is incremented upon every start-up of the application, and the usage of the application is prohibited when the counter exceeds a predetermined count value.

In the above method of managing the expiration of usage of the application, there exist problems as indicated below.

Firstly, the means of restricting the usage of the application should be incorporated in the individual application by the vender thereof, which increases burden of the vender.

Further, the initial date of reckoning is determined by a user (client) and cannot be determined by the vender. Therefore, the vender is unable to obtain the expiration information correctly, and is unable to inspect whether the expiration date is held correctly by each client.

When the usage is restricted based on the number of start-ups, it is only managed at the client side (i.e., by the PDA) since the vender of a server cannot obtain the number of start-ups of the application from each client. Thus, according to this method, the server or the vender cannot manage the expiration of the application. Further, if the application is configured to update data related to the expiration period in the PDA, it can easily be recognized by the client. If an ill-willed user rewrites the data related to the expiration, the application may be used even if the number of start-ups exceeds the upper limit.

Furthermore, in a conventional system in which a program is sold by user's downloading (i.e., when the application is downloaded, billing is executed), the following problem may occur. That is, when the user is downloading the application, the downloading process may be aborted due to some reason such as a communication error. Therefore, for the server, it is necessary to confirm that the download is successfully completed, which requires a troublesome procedure for the server. There is a system which allows re-downloading of the application for a certain period in case the previous downloading was unsuccessful. In such a case, however, if the specified period is expired, the user cannot download the application again. In such a case, even if the user has paid for the application, he/she cannot download the application for free.

SUMMARY OF THE INVENTION

The present invention is advantageous in that the expiration of usage of contents is managed both in the server and client, and the period of usage is correctly kept in each client.

Further, according to an embodiment, registration of a new client device, recovery of registration can be performed relatively easily.

Further, according to an embodiment, the user is capable of recognizing status of each application in terms of its expiration easily.

According to an aspect of the invention, there is provided a method of managing downloading contents in a network system including a terminal device, a management server and a downloading site. The method includes executing a first phase procedure in which the management server receives a request for downloading contents from the terminal device and performs a predetermined registration operation, executing a second phase procedure in which the management server transmits attribution data corresponding to the contents to be downloaded by the terminal device, the attribution data including information of the downloading site, the attribution data further including usage period data indicative of a period during which the contents can be used in the terminal device, and executing a third phase procedure in which the terminal device accessed the downloading site in accordance with the information included in the attribution data and downloads the contents. Further, the terminal device includes an execution inhibiting system that inhibits handling of the contents after the period indicated by the usage period data has expired.

Optionally, the terminal device has storage. The attribution data and the contents can be stored in the storage separately.

Further optionally, the network system may further include a billing server handling billing to a user of the terminal device. In the first phase procedure, the management server may be configured to instruct the billing server to bill the user for the contents upon receipt of the request for downloading.

In this case, the billing server may transmit a predetermined command to the management server when the billing is completed, and the management server may perform the predetermined registration operation after the predetermined command is received from the billing server.

Furthermore, the request for downloading may include a request for purchasing the contents.

Additionally, the request for downloading may include a request for a trial use of the contents.

Optionally, the usage period may include a number of times the contents is allowed to be used.

Alternatively, the usage period may include an expiration date of the usage period. In this case, the expiration date may be calculated based on a date when the request for downloading was transmitted from the terminal device and a usable period assigned to the contents to be downloaded.

Still optionally, the terminal device may include a displaying system that displays a status regarding the usage period of the contents.

Further, the terminal device may include a remaining period calculating system that calculates a remaining period to the end of the usage period, the displaying system displays the remaining period of the contents.

In a particular case, the displaying system may display the usage period as a graphic symbol.

Further optionally, in the second phase procedure, the management server may transmit confirmation data indicative of completion of registration to the terminal device. The terminal device may transmit a request for the attribution data to the management server in response to receipt of the confirmation data, and the management server may transmit the attribution data to the terminal device in response to the request for the attribution data transmitted from the terminal device.

In this case, the confirmation data may include an HTML file including a predetermined embedded command, the terminal device returning the predetermined embedded command upon receipt of the HTML file, the management server transmitting the attribution data in response to the predetermined embedded command transmitted from the terminal device.

If a communication error occurs between the management server and the terminal device during the second phase procedure, the second phase procedure is re-executed. It should be noted that, once the first phase procedure is completed, it is unnecessary to re-execute the first phase operation.

Optionally, if a communication error occurs between the terminal device and the downloading site during the third phase procedure, the third phase procedure is re-executed.

Optionally, the management server may manage the terminal server in accordance with a management method, which includes receiving personal information of the user input through the terminal device, assigning a member ID to the user, assigning a terminal ID to the terminal, managing the terminal ID in relationship to the member ID, and transmitting the member ID and the terminal ID to the terminal device, the member ID and the terminal ID being stored in the terminal device.

In this case, the terminal ID may be managed either in the management server or in the terminal device so as not to be recognized by the user.

In an embodiment, the management method may further include receiving a device type ID when the terminal device is connected to the server, and judging whether the received device type ID is one of predetermined device type IDs.

Optionally or alternatively, the management method may include receiving a name of the terminal device through the terminal device, managing the terminal ID and the name of the terminal device in relationship to the member ID, and transmitting the member ID, the terminal ID and the name of the terminal to the terminal device, the member ID, the terminal ID and the name of the terminal being stored in the terminal device.

In this case, the management method may further include requesting for input of the member ID and the password if the member ID and the terminal ID are not transmitted from the terminal device when the terminal device connects for the service provided by the server, asking the user whether the terminal device is subject to recovery or addition if the member ID and the password as input are valid, asking the user to input a preliminary registered name of a preliminary registered terminal device of the user if the terminal device is subject to recovery, transferring registered information corresponding to the preliminary registered name into registered information corresponding to the terminal device subject to recovery, and asking the user to input a new name of the terminal device if the terminal device is subject to addition, a new terminal ID being assigned to the terminal device, the new terminal ID and the new name being managed in relations to the member ID, the new terminal ID, the new name and the new name being transmitted to the terminal device so as to be saved therein.

According to another aspect of the invention, there is provided a contents management system for managing downloading and handling of contents in a network system which includes a terminal device, a management server and a downloading site. In this system, the management server receives a request for downloading contents from the terminal device and performs a predetermined registration operation. Further, the management server transmits attribution data corresponding to the contents to be downloaded by the terminal device, the attribution data including information of the downloading site, the attribution data further including usage period data indicative of a period during which the contents can be used in the terminal device. The terminal device may access the downloading site in accordance with the information included in the attribution data and downloads the contents, the terminal device including an execution inhibiting system that inhibits handling of the contents after the period indicated by the usage period data has expired.

Optionally, the terminal device may have storage. The attribution data and the contents being stored in the storage separately.

Still optionally, the network system may include a billing server handling billing to a user of the terminal device, and the management server may instruct the billing server to bill the user for the contents upon receipt of the request for downloading.

Further, the billing server may transmit a predetermined command to the management server when the billing is completed, and the management server performs the predetermined registration operation after the predetermined command is received from the billing server.

Optionally, the request for downloading may include a request for purchasing the contents.

Additionally, the request for downloading may include a request for a trial use of the contents.

Still optionally, the usage period may include a number of times the contents is allowed to be used.

Further, the usage period may include an expiration date of the usage period.

In a particular case, the expiration date may be calculated based on a date when the request for downloading was transmitted from the terminal device and a usable period assigned to the contents to be downloaded.

Optionally, the terminal device includes a displaying system that displays a status regarding the usage period of the contents.

Further, the terminal device may include a remaining period calculating system that calculates a remaining period to the end of the usage period, the displaying system displays the remaining period of the contents.

Furthermore, the displaying system may display the usage period as a graphic symbol.

Still optionally, the management server may transmit confirmation data indicative of completion of registration to the terminal device. The terminal device may transmit a request for the attribution data to the management server in response to receipt of the confirmation data, and the management server may transmit the attribution data to the terminal device in response to the request for the attribution data transmitted from the terminal device.

In this case, the confirmation data may include an HTML file including a predetermined embedded command, the terminal device returning the predetermined embedded command upon receipt of the HTML file, the management server transmitting the attribution data in response to the predetermined embedded command transmitted from the terminal device.

Further optionally, if a communication error occurs between the management server and the terminal device when the terminal device downloading the attribution data, downloading procedure is re-executed.

Further, if a communication error occurs between the terminal device and the downloading site when the terminal device downloads the contents, the downloading procedure is re-executed.

Optionally, the management server may manage the terminal server in accordance with a management method, which includes receiving personal information of the user input through the terminal device, assigning a member ID to the user, assigning a terminal ID to the terminal, managing the terminal ID in relationship to the member ID, and transmitting the member ID and the terminal ID to the terminal device, the member ID and the terminal ID being stored in the terminal device.

Optionally, the management method may include receiving a name of the terminal device through the terminal device, managing the terminal ID and the name of the terminal device in relationship to the member ID, and transmitting the member ID, the terminal ID and the name of the terminal to the terminal device, the member ID, the terminal ID and the name of the terminal being stored in the terminal device.

In this case, the management method may further include requesting for input of the member ID and the password if the member ID and the terminal ID are not transmitted from the terminal device when the terminal device connects for the service provided by the server, asking the user whether the terminal device is subject to recovery or addition if the member ID and the password as input are valid, asking the user to input a preliminary registered name of a preliminary registered terminal device of the user if the terminal device is subject to recovery, transferring registered information corresponding to the preliminary registered name into registered information corresponding to the terminal device subject to recovery, and asking the user to input a new name of the terminal device if the terminal device is subject to addition, a new terminal ID being assigned to the terminal device, the new terminal ID and the new name being managed in relations to the member ID, the new terminal ID, the new name and the new name being transmitted to the terminal device so as to be saved therein.

According to a further aspect of the invention, there is provided a terminal device for a contents management system which downloading and handling of contents in a network system, the network system including the terminal device, a management server and a downloading site. The terminal device may be configured to transmit a request for downloading contents to the management server, the management server performing a predetermined registration operation upon receipt of the request for downloading the contents. The terminal device receives attribution data corresponding to the contents to be downloaded from the management server, the attribution data including information of the downloading site, the attribution data further including usage period data indicative of a period during which the contents can be used in the terminal device. Further, the terminal device may access the downloading site in accordance with the information included in the attribution data and downloads the contents, the terminal device including an execution inhibiting system that inhibits handling of the contents after the period indicated by the usage period data has expired.

Optionally, the terminal device may include storage. The attribution data and the contents being stored in the storage separately.

Optionally, the network system may include a billing server handling billing to a user of the terminal device, and the management server may instruct the billing server to bill the user for the contents upon receipt of the request for downloading.

Further, the billing server may transmit a predetermined command to the management server when the billing is completed, and the management server may perform the predetermined registration operation after the predetermined command is received from the billing server.

Optionally, the request for downloading includes a request for purchasing the contents. Further, the request for downloading may include a request for a trial use of the contents.

Further optionally, the usage period may include a number of times the contents is allowed to be used.

In a particular case, the usage period may include an expiration date of the usage period.

Optionally, the expiration date may be calculated based on a date when the request for downloading was transmitted from the terminal device and a usable period assigned to the contents to be downloaded.

Optionally, the terminal device may include a displaying system that displays a status regarding the usage period of the contents.

Further, the terminal device may include a remaining period calculating system that calculates a remaining period to the end of the usage period, the displaying system displays the remaining period of the contents.

Optionally, the displaying system may display the usage period as a graphic symbol.

Still optionally, the management server may transmit confirmation data indicative of completion of registration to the terminal device. The terminal device may transmit a request for the attribution data to the management server in response to receipt of the confirmation data, and the management server may transmit the attribution data to the terminal device in response to the request for the attribution data transmitted from the terminal device.

Furthermore, the confirmation data may include an HTML file including a predetermined embedded command, the terminal device returning the predetermined embedded command upon receipt of the HTML file, the management server transmitting the attribution data in response to the predetermined embedded command transmitted from the terminal device.

Still optionally, if a communication error occurs between the management server and the terminal device during downloading of the attribution data, the downloading procedure is re-executed.

Further, if a communication error occurs between the terminal device and the downloading site during downloading of the contents, the downloading procedure is re-executed.

Optionally, the management server may manage the terminal device in accordance with a management method, which includes receiving personal information of the user input through the terminal device, assigning a member ID to the user, assigning a terminal ID to the terminal device, managing the terminal ID in relationship to the member ID, and transmitting the member ID and the terminal ID to the terminal device, the member ID and the terminal ID being stored in the terminal device.

Further, the management method may include receiving a name of the terminal device through the terminal device, managing the terminal ID and the name of the terminal device in relationship to the member ID, and transmitting the member ID, the terminal ID and the name of the terminal to the terminal device, the member ID, the terminal ID and the name of the terminal being stored in the terminal device.

Furthermore, the management method may include requesting for input of the member ID and the password if the member ID and the terminal ID are not transmitted from the terminal device when the terminal device connects for the service provided by the server, asking the user whether the terminal device is subject to recovery or addition if the member ID and the password as input are valid, asking the user to input a preliminary registered name of a preliminary registered terminal device of the user if the terminal device is subject to recovery, transferring registered information corresponding to the preliminary registered name into registered information corresponding to the terminal device subject to recovery, and asking the user to input a new name of the terminal device if the terminal device is subject to addition, a new terminal ID being assigned to the terminal device, the new terminal ID and the new name being managed in relations to the member ID, the new terminal ID, the new name and the new name being transmitted to the terminal device so as to be saved therein.

According to a further aspect of the invention, there is provided a management server of a contents management system for managing downloading and handling of contents in a network system, the contents management system further including a terminal device and a downloading site. The management server may receive a request for downloading contents from the terminal device and performs a predetermined registration operation, then the management server may transmit attribution data corresponding to the contents to be downloaded by the terminal device, the attribution data including information of the downloading site, the attribution data further including usage period data indicative of a period during which the contents can be used in the terminal device. Further, the terminal device may access the downloading site in accordance with the information included in the attribution data and downloads the contents, the terminal device including an execution inhibiting system that inhibits handling of the contents after the period indicated by the usage period data has expired.

Optionally, the terminal device may have storage. The attribution data and the contents being stored in the storage separately.

Further, the network system may include a billing server handling billing to a user of the terminal device, and the management server may instruct the billing server to bill the user for the contents upon receipt of the request for downloading.

Still optionally, the billing server may transmit a predetermined command to the management server when the billing is completed, and the management server may perform the predetermined registration operation after the predetermined command is received from the billing server.

In a certain case, the request for downloading includes a request for purchasing the contents. Further, the request for downloading may further include a request for a trial use of the contents.

Further, the usage period may include a number of times the contents is allowed to be used.

In a particular case, the usage period may include an expiration date of the usage period.

Still optionally, the expiration date may be calculated based on a date when the request for downloading was transmitted from the terminal device and a usable period assigned to the contents to be downloaded.

In this case, the terminal device may further include a displaying system that displays a status regarding the usage period of the contents.

Furthermore, the terminal device may include a remaining period calculating system that calculates a remaining period to the end of the usage period, the displaying system displays the remaining period of the contents.

Optionally, the displaying system displays the usage period as a graphic symbol.

Further, the management server may transmit confirmation data indicative of completion of registration to the terminal device, the terminal device transmits a request for the attribution data to the management server in response to receipt of the confirmation data, and the management server may transmit the attribution data to the terminal device in response to the request for the attribution data transmitted from the terminal device.

Optionally, the confirmation data may include an HTML file including a predetermined embedded command, the terminal device returning the predetermined embedded command upon receipt of the HTML file, the management server transmitting the attribution data in response to the predetermined embedded command transmitted from the terminal device.

Still optionally, if a communication error occurs between the management server and the terminal device when the terminal device downloading the attribution data, downloading procedure is re-executed.

Further, if a communication error occurs between the terminal device and the downloading site when the terminal device downloads the contents, the downloading procedure is re-executed.

Furthermore, the management server may manage the terminal server in accordance with a management method, which includes receiving personal information of the user input through the terminal device, assigning a member ID to the user, assigning a terminal ID to the terminal, managing the terminal ID in relationship to the member ID, and transmitting the member ID and the terminal ID to the terminal device, the member ID and the terminal ID being stored in the terminal device.

Optionally, the management method may further include receiving a name of the terminal device through the terminal device, managing the terminal ID and the name of the terminal device in relationship to the member ID, and transmitting the member ID, the terminal ID and the name of the terminal to the terminal device, the member ID, the terminal ID and the name of the terminal being stored in the terminal device.

Still optionally, the management method may include requesting for input of the member ID and the password if the member ID and the terminal ID are not transmitted from the terminal device when the terminal device connects for the service provided by the server, asking the user whether the terminal device is subject to recovery or addition if the member ID and the password as input are valid, asking the user to input a preliminary registered name of a preliminary registered terminal device of the user if the terminal device is subject to recovery, transferring registered information corresponding to the preliminary registered name into registered information corresponding to the terminal device subject to recovery, and asking the user to input a new name of the terminal device if the terminal device is subject to addition, a new terminal ID being assigned to the terminal device, the new terminal ID and the new name being managed in relations to the member ID, the new terminal ID, the new name and the new name being transmitted to the terminal device so as to be saved therein.

According to a further aspect of the invention, there is provided a computer program executed by a controller of a terminal device to realize a method of downloading and using contents through a network system, the network system including the terminal device, a management server and a downloading site, the computer program defining a method including the steps of transmitting a request for downloading contents to the management server, the management server performing a predetermined registration operation upon receipt of the request, receiving, from the management server, attribution data corresponding to the contents to be downloaded by the terminal device, the attribution data including information of the downloading site, the attribution data further including usage period data indicative of a period during which the contents can be used in the terminal device, and accessing the downloading site in accordance with the information included in the attribution data and downloading the contents, and the terminal device includes an execution inhibiting system that inhibits handling of the contents after the period indicated by the usage period data has expired.

In this case, the request for downloading may include a request for purchasing the contents.

Optionally, the request for downloading includes a request for a trial use of the contents.

Still optionally, the usage period may include a number of times the contents is allowed to be used.

Alternatively, the usage period may include an expiration date of the usage period.

Further optionally the method includes a step of calculating a remaining period to the end of the usage period.

Furthermore, the management server may transmit confirmation data indicative of completion of registration to the terminal device. The method may include a step of transmitting a request for the attribution data to the management server in response to receipt of the confirmation data, and the management server may transmit the attribution data to the terminal device in response to the request for the attribution data transmitted from the terminal device.

Optionally, if a communication error occurs between the management server and the terminal device when the attribution data is downloaded, the step of downloading the attribution data is re-executed.

Further, if a communication error occurs between the terminal device and the downloading site when the contents are downloaded, the step of downloading the contents is re-executed.

According to another aspect of the invention, there is provided a computer program executed by a controller of a management server of a network system to realize a method of managing downloading of contents in the network system, the network system including a terminal device, the management server and a downloading site. The program defines a method including the steps of executing a first phase procedure in which the management server receives a request for downloading contents from the terminal device and performs a predetermined registration operation, and executing a second phase procedure in which the management server transmits attribution data corresponding to the contents to be downloaded by the terminal device, the attribution data including information of the downloading site, the attribution data further including usage period data indicative of a period during which the contents can be used in the terminal device. The terminal device may access the downloading site in accordance with the information included in the attribution data and downloads the contents.

Further, the terminal device may include an execution inhibiting system that inhibits handling of the contents after the period indicated by the usage period data has expired.

Optionally, the network system may further include a billing server handling billing to a user of the terminal device, and the first phase procedure may include a step of instructing the billing server to bill the user for the contents upon receipt of the request for downloading.

Further optionally, the billing server may transmit a predetermined command to the management server when the billing is completed, and the first phase procedure includes a step of performing the predetermined registration operation after the predetermined command is received from the billing server.

Still optionally, the second phase procedure may include a step of transmitting confirmation data indicative of completion of registration to the terminal device. Further, the terminal device transmits a request for the attribution data to the management server in response to receipt of the confirmation data, and the second phase procedure further include a step of transmitting the attribution data to the terminal device in response to the request for the attribution data transmitted from the terminal device.

In this case, the confirmation data may include an HTML file including a predetermined embedded command, the terminal device returning the predetermined embedded command upon receipt of the HTML file, and the step of transmitting transmits the attribution data in response to the predetermined embedded command transmitted from the terminal device.

Optionally, the method by the program further includes the steps of receiving personal information of the user input through the terminal device, assigning a member ID to the user, assigning a terminal ID to the terminal device, managing the terminal ID in relationship to the member ID, and transmitting the member ID and the terminal ID to the terminal device, the member ID and the terminal ID being stored in the terminal device.

Optionally, the program further includes the steps of receiving a device type ID when the terminal device is connected to the server, and judging whether the received device type ID is one of predetermined device type IDs.

Further optionally, the method defined by the program further including the steps of receiving a name of the terminal device through the terminal device, managing the terminal ID and the name of the terminal device in relationship to the member ID, and transmitting the member ID, the terminal ID and the name of the terminal to the terminal device, the member ID, the terminal ID and the name of the terminal being stored in the terminal device.

Furthermore, the method defined by the program may include the steps of requesting for input of the member ID and the password if the member ID and the terminal ID are not transmitted from the terminal device when the terminal device connects for the service provided by the server, asking the user whether the terminal device is subject to recovery or addition if the member ID and the password as input are valid, asking the user to input a preliminary registered name of a preliminary registered terminal device of the user if the terminal device is subject to recovery, transferring registered information corresponding to the preliminary registered name into registered information corresponding to the terminal device subject to recovery, and asking the user to input a new name of the terminal device if the terminal device is subject to addition, a new terminal ID being assigned to the terminal device, the new terminal ID and the new name being managed in relations to the member ID, the new terminal ID, the new name and the new name being transmitted to the terminal device so as to be saved therein.

BRIEF DESCRIPTION OF THE DRAWINGS

The present invention will be understood and appreciated from the following detailed description, taken in conjunction with the drawings in which:

FIG. 1 is a block diagram schematically showing a system configuration according to an embodiment of the invention;

FIG. 2 is flow diagram illustrating a service according to the first embodiment;

FIGS. 3A through 3F show various examples of execution environments of applications or the like, to which the present invention is applicable;

FIG. 7 shows an example of ADF information according to the embodiment;

FIGS. 10A through 10D show transition of displayed image on the user terminal when the member registration is performed;

FIGS. 11A through 11F show transition of displayed image on the user terminal when a terminal registration is performed;

FIG. 12A shows a log-in image and FIG. 12B shows an image of Top Menu;

FIGS. 15A through 15E show transition of displayed images when a user applies for updating (including purchasing) of the expiration period through the MY MENU;

FIGS. 20A through 20D show exemplary screen images displaying various information;

DETAILED DESCRIPTION OF THE EMBODIMENT

Figure 4:
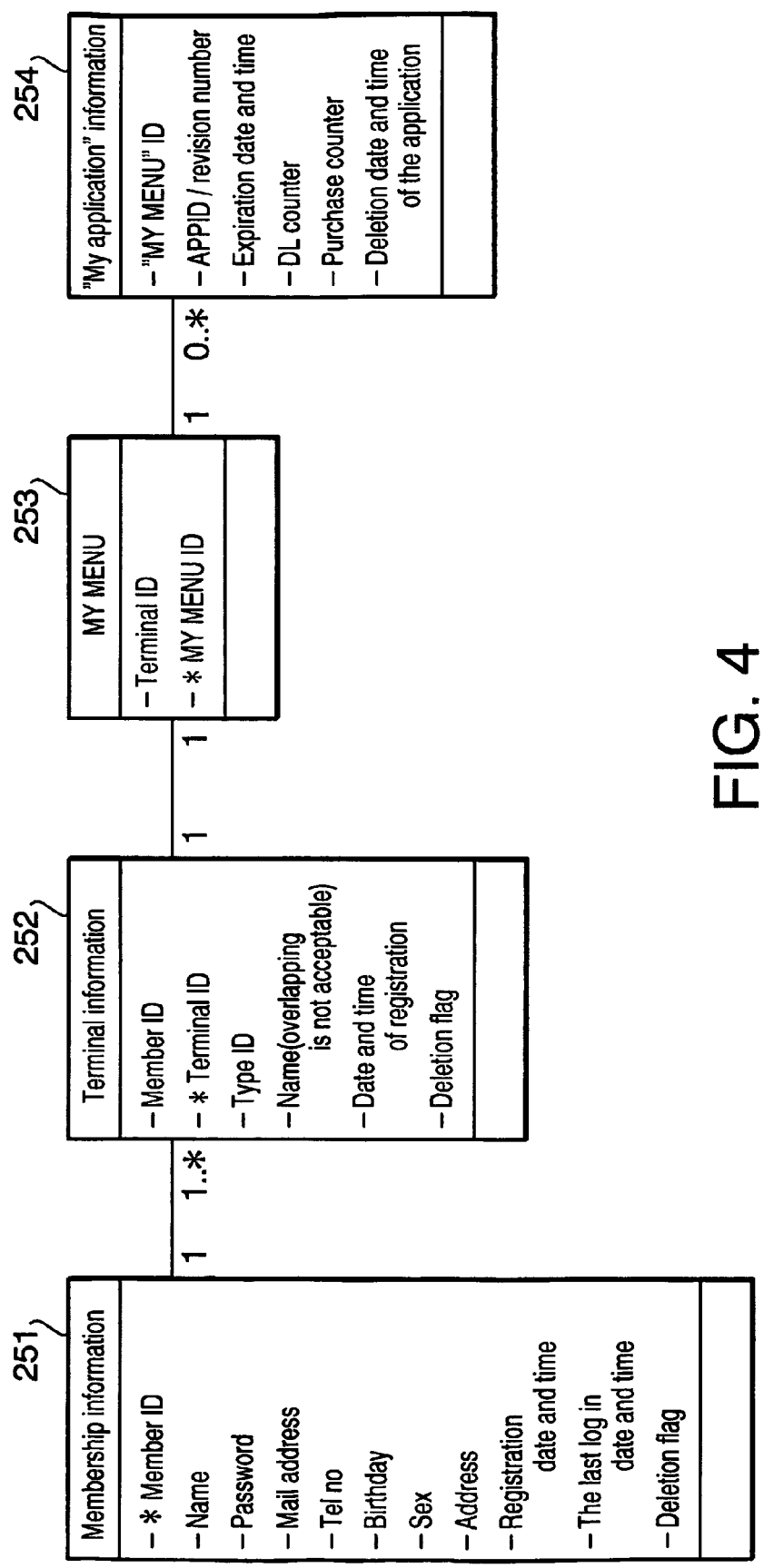
FIG. 4 shows an example of membership database according to the embodiment.
Figure 5:
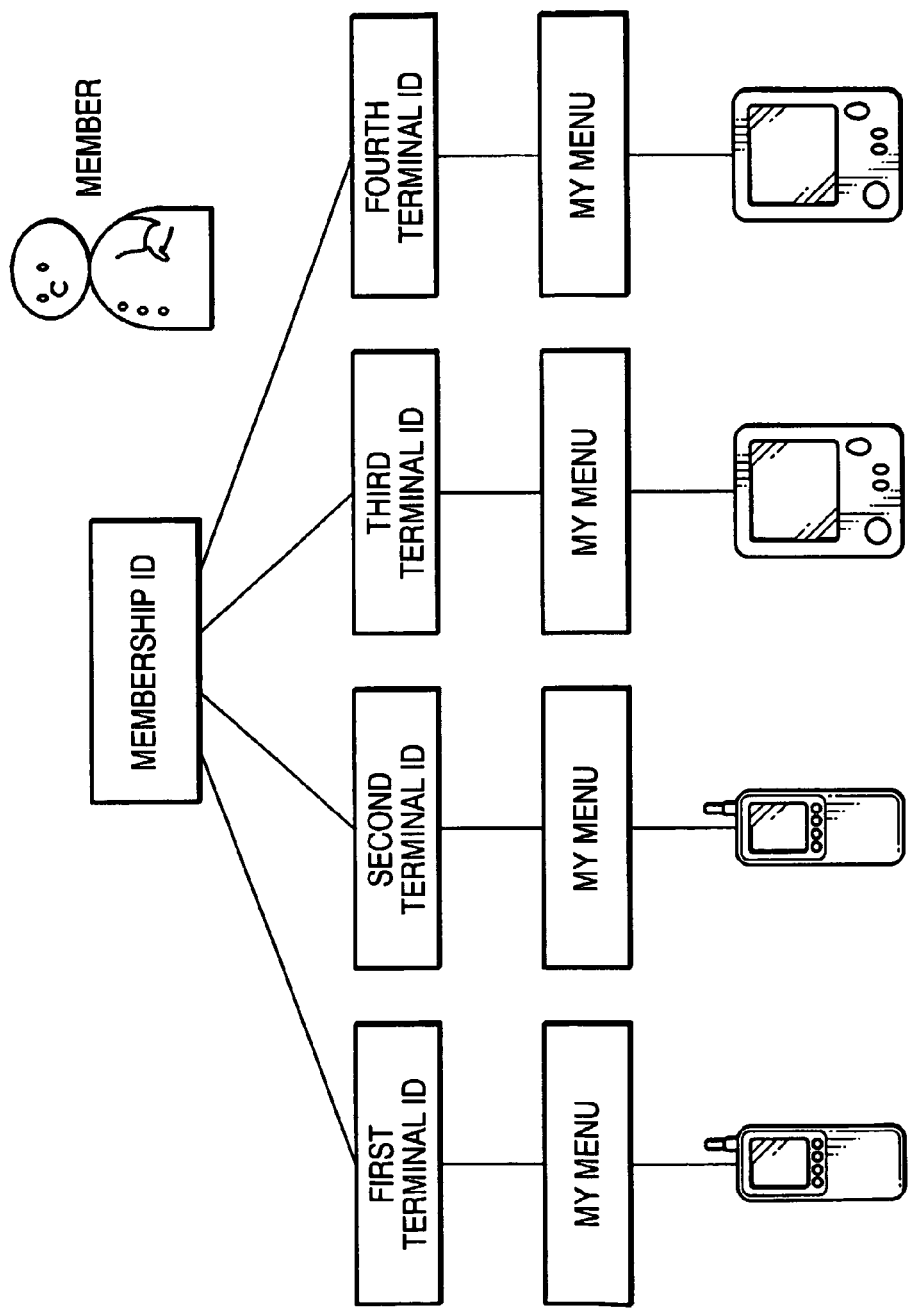
FIG. 5 shows a relationship between members, member IDs, terminal IDs and "MY MENU" for each terminal.

Hereinafter, an expiration management system according to an embodiment of the invention will be described with reference to the accompanying drawings.

FIG. 1 is a block diagram schematically showing a configuration of the expiration management system 1000 according to an embodiment of the invention.

The expiration management system 1000 includes a plurality of terminal devices 10, a management center 200, application venders 300, a storage service server 420 and a print service server 430, which are interconnected through a network such as the Internet.

The management center 200 manages applications (which includes software, electrical data and the like) developed or created by application venders 300, and distributes the same to the users of the terminal devices 10. The management center 200 mediates a network service such as storage service and print service provided by the storage service server 420 and the print service server 430, respectively, to the users of the terminal devices 10.

In order to achieve the above function, the management center 200 is provided with a portal site 210 and a management server 220. The portal site 210 is a web site having a billing management section 215, and functions to bill users who use pay service, payware and the like, and to accept the payment therefor by means of electronic money. The portal site 210 includes a web server and various CGI (not shown). The management server 220 includes an application holder 225 which stores applications provided by the application venders 300, a network service interface 240 which interfaces the storage service server 420 and the print service server 430, and a management section 230 which manages the applications and the services. The management section 230 is provided with a membership data base 150 and an application data base 260. In FIG. 1, as an example of the application, Java application is indicated.

The terminal devices 10 are so-called non-PC terminal devices, which are network terminal devices other than personal computers (PC), according to the embodiment. The non-PC terminal devices have characteristics which are: (a) a processing speed of a CPU is relatively slow; (b) a capacity of a RAM is relatively small; (c) a capacity of a local storage is relatively small (not a gigabyte hard disk but a megabyte flash memory); (d) relatively low extendability; and (e) a relatively small display screen, in comparison with a typical PC. With the above characteristics, for the non-PC terminal devices 10, there are various restrictions both in the hardware and software. It should be noted that the non-PC terminal devices include a PDA (personal digital assistant).

The PDA may be provided with a built-in communication unit including a LAN interface, a modem, a wireless communication device or the like. Optionally or alternatively, the PDA may be configured to have a card slot for a compact flash memory or the like, in which a LAN card, a modem card, a wireless communication card may be inserted.

Generally, PDAs are portable devices, however, according to the embodiment, PDA may include a stationary device set up on a desk or the like. Further, some PDAs are implemented in wrist watches. Furthermore, the non-PC terminal devices may include network electrical household appliances and electrical equipment (which may be called net electrical appliances, Internet appliances, information electrical equipment and the like), which have function for connecting a computer network including the Internet. Examples of the internet electrical equipment include an internet television set, a digital television set, a set top box for a CATV, a game machine, a telephone device, a facsimile device, a printer, a copier, a scanner and the like. Further, the internet electrical equipments include a refrigerator, a microwave oven, an electric hot-water pot, an electric rice cooker, a coffee maker, an air conditioner, which are connectable with the Internet. The non-PC terminal devices include mobile communication devices, which are devices movable in association with a person or vehicle. Examples of the mobile communication devices are a cell phone, a PHS terminal, a car navigation terminal device, an in-vehicle audio device, an in-vehicle radio, an in-vehicle television set, an in-vehicle video player, a digital camera and the like.

The terminal devices 10 includes a browser 70 for viewing web pages, a JAM (Java Application Manager) 64 for downloading applications and the like and managing files, a local storage 67 for storing the downloaded applications and the like, and an application execution section 60 which executes the application 80. In FIG. 1, the local storage 67 in the terminal device 10 is hardware, but the other blocks are realized by software, and can be stored in the local storage 67.

The application execution section 60 includes, according to the embodiment, a Java VM (Java virtual machine) 61, a class library 62, and an API (Application Program Interface) 66 capable of handling the network services. It should be noted that the Java VM 61 is a program module executing a Java byte code, which runs on an OS (operation system) which is not shown.

The JAM 64 executes downloading of the Jar file, ADF (application descriptor file) and the like, management of the ADF files including analysis thereof, and exchanges messages with the Java VM 61.

The Jar file is a Java application in the form of Jar, and thus the body of the application. The ADF file is application attribution data to be downloaded prior to downloading of the Jar file in accordance with action related to usage of the application and the like such as the trial, purchase or update of an application or the like. The ADF file is thus used for judging whether the Jar file is successfully downloaded, whether billing is done, and for authenticating a code signature of Jar file. According to the embodiment, the ADF file includes an expiration attribution indicative of the expiration of usage. In association with incorporation of the expiration attribution, an enhanced section 65 is provided in the JAM 65 to execute various procedures related to the management of the expiration of the usage.

Specifically, the enhanced section 65 manages the expiration of usage of the downloaded application, a clock (including its calendar function), the member ID, and the terminal ID. The enhanced section 65 further provides a security function (encryption, restriction of a range of user accessible resources (mainly network domain) and a user interface for guiding the management functions above for the user.

The API 66 capable of handling the network services has a function of informing a user' s request, which is issued when the user requests file operation or printing through a predetermined application, to the interface 240 of the server.

The application the terminal device 10 executes may be downloaded directly from the application vender 300 or the like instead of downloading froth the application holder 225 of the management server 225.

FIG. 2 is a flow diagram illustrating a service according to the first embodiment.

Firstly, the application vender 300 registers a developed application 80 with the management section 230 of the management server 220 of the management center 200, and stores the application 80 in the application holder 225 (①). At this stage, although it is not necessary, an administrator of the management center 200 may toll a fiduciary fee for the registered application 80. The management center 200 accepts a membership registration for the present service from a user of the terminal device 10 through the portal site 210 (②). At the same time, the management center 200 opens a settlement account 235 of the registered user for the electronic commerce (③). It should be noted that, according to the embodiment, the electronic money is used for settlement. However, it is only an example, and the invention is not limited to the settlement using the electronic money.

Thereafter, the user, who is the member of the service, accesses the portal site 210 using the terminal device 10, selects a desired application, and downloads the same (④). According to the embodiment, at an initial stage of usage, the user is allowed to use the application for free for a trial use (⑤). If the user determines to keep using the application, he/she can submit a registration (purchase request) to the management server 220 (⑥). At this stage, the user pays a usage fee (⑦). By the payment, the user receives a formal license to the usage of the application (⑧). According to the embodiment, the application is provided by lease so that a usable period is limited. In this embodiment, the term "lease" is used in a broad sense, and includes a case where the application is rent (i.e., rental). The license the user holds is a license to the usage of the applications or the like with an expiration period. In other words, purchasing the license means purchasing a right to use an application for a predetermined limited period (by the expiration date/time). With this configuration, the user is required to make payment corresponding only to a period during which the user wishes to use the application. Depending on necessity, the user may extend the expiration term, or re-purchase the application after the predetermined limited period has passed.

From the payment by the user, a charge of the management center 200 is subtracted, and the remainder is given to the application vender 300 (⑨). If the application is capable of using the network services, by executing the application, the storage service and/or the print service can be used. The storage service is a service for providing a storage area for each member through the portal site, and the print service is a service for printing an image of digital photo data for the like provided by members. For such network services, the expiration of usage is set, and the user can make use of the services by paying appropriate charges (⑩ and ⑪). Similarly to the application, from the payment for the services, the charges for the management center 200 are subtracted, and the remainder is given to the service providers (⑫).

FIG. 3A shows a fundamental model of the terminal device 10 according to the embodiment. As shown in FIG. 3A, the application and the like are used in an application execution environment 52 built up on an OS (Operation System) 50, and further, an expiration management function 53 in association with the application execution environment 52 manages the expiration of usage of individual application and the like. It should be noted that the application and the like according to the embodiment include application programs such as aforementioned Java applications and a part of the components of such applications. Further, the application and the like may include a text, image (still or moving), music and/or web contents such as Mark-up Language files and the like. The application execution environment implies a program or a group or program executed on the OS and providing an environment for a user to execute the application and the like. Usage of the application includes various actions such as browsing, listening, using or executing. Examples of applications and their execution environments are indicated in FIGS. 3B1, 3B2, 3B3, 3C through 3F.

FIGS. 3B1, 3B2 and 3B3 show relationships between applications and their execution environments. As shown in FIG. 3B1, when a Java application is executed, a Java virtual machine (Java VM) interprets Java byte code, and executes it. In a case shown in FIG. 3B2, an application may be created using the C language, which is complied to create an execution file (a so-called exe file). The thus created execution file is loaded with a loader on a memory and executed by a CPU. FIG. 3B3 is similar to a case of FIG. 3B2 except that the execution file is replaced with a combination of an execution file and related components. In this model, when the application is executed, the associated components are referred to. It should be noted that, in such a configuration, the execution file and the associated components are regarded as an application, and the execution may be considered as a part of the entire application. According to the embodiment, such an execution (i.e., a part of the entire application) may also be subject to be downloaded.

FIGS. 3C, 3D, 3E and 3F show examples of data to be downloaded other than the execution files. When image data is downloaded, it can be displayed on a display device using a viewer corresponding to the format of the image data. If the image data is compressed, the viewer may expand the image data. If a moving picture is to be viewed, a moving picture player corresponding to the format of the moving picture is used. For music data, a music player corresponding to the format of the music data is used. In many cases, the music data is compressed (e.g., MP3 data), and the music player is typically configured to expand the compressed data. Text data is also subjected to be downloaded, and viewed by a viewer. A typical example of the text file is an HTML file, which is viewed using a text viewer such as a browser. In particular, when the HTML file is viewed, the viewer or the browser interpret the definitions (know as tags) and display the text in accordance with the definition.

As aforementioned, according to the embodiment, not only execution files but also various forms of contents (i.e., execution files, scripts, a part of application, image data, animation data, music data and the like. In the specification, a term "content(s)" refers to the above-described execution file, image data, Java scripts, moving picture data, music data, text data and the like. Further, the term "application" refers to an execution file in the narrow sense, and refers to the contents in the broad sense.

The management server 220 of the management center 200 has the membership data base 250 used for managing the member information corresponding to the provided service, and the application data base 260 for managing the applications and the like registered by the application venders.

FIG. 4 shows an example of membership database 250 according to the embodiment. The membership data base 250 is kept and managed by the management section 230 of the management server 220. In the example shown in FIG. 4, when a member is registered, a record of the membership information 251 is created. The membership information 251 typically includes the member ID, name of the member, a password, a mail address, a telephone number (telno), a birthday, a sex, an address, the registration data and time, the last log-in date and time, a deletion flag.

For the membership information 251, at least one record of terminal information 252 is created. The terminal information 252 is information indicative of a terminal device to be used for using the present service by the user. In this example, the terminal information 252 includes the member ID, the terminal ID, a terminal name, date and time of registration, a deletion flag.

The member ID is identification information uniquely assigned to each member when the member is registered. The terminal ID is identification information used for the present service (e.g., a serial number) which is uniquely assigned by the server to the terminal device when the registration is made. It should be noted that the number of records of the terminal information 252 corresponding to the number of the terminal devices registered by a single member.

For each record of the terminal information 252, "MY MENU" 253 is created with one-to-one correspondence. The "MY MENU" 253 is for managing a certain group of applications which are selected by the user (member) from among all the applications managed and provided by the management server 220. The terminal ID and the "MY MENU" ID are retained and only the member corresponding to the terminal and MY MENU IDs is allowed to browse the "MY MENU" 253.

In the "MY MENU" 253, a new record of "my application" information 254 is added. The "my application" information 254 is created when a trial or normal usage of a new application is started in the terminal device. The "my application" information 254 includes: "MY MENU" ID, an application ID (APPID)/revision number, expiration date and time, download (DL) counter, purchase counter, deletion date and time of the application. It should be stressed that the expiration date and time represents the expiration date and time of the application. The number of purchases means the number of downloads of an application when the payment of the charges thereof does not necessarily coincide with the value of the DL counter indicating the number of download since the download can be performed repeatedly for free during a period in which the download is allowed.

As understood from the structure of the membership database, according to the embodiment, when a single member uses a plurality of terminal devices and uses the provided service, a plurality of terminal IDs are given to a single member ID, and to each terminal ID, a "MY MENU" is assigned. For example, the application purchased using a first terminal device is registered with a "MY MENU" of the first terminal device, and cannot be accessed using another terminal device. Thus, the application is not shared among the plurality of terminal devices of a user. It is because: (1) in order to prevent dishonest usage such that a plurality of users use the same application in different terminal devices; (2) it would be very difficult to transmit updating of the expiration date to a plurality of terminal devices when, for example, the user pays an appropriate fee to buy "extension" of expiration date; and (3) to avoid a problem such that an application a member purchased through one terminal device does not work in another terminal device.

In order to deal with a failure which occurs in the terminal device or loss of the terminal device before the expiration date of an application, a recovery function is provided, which will be described later.

Figure 6:
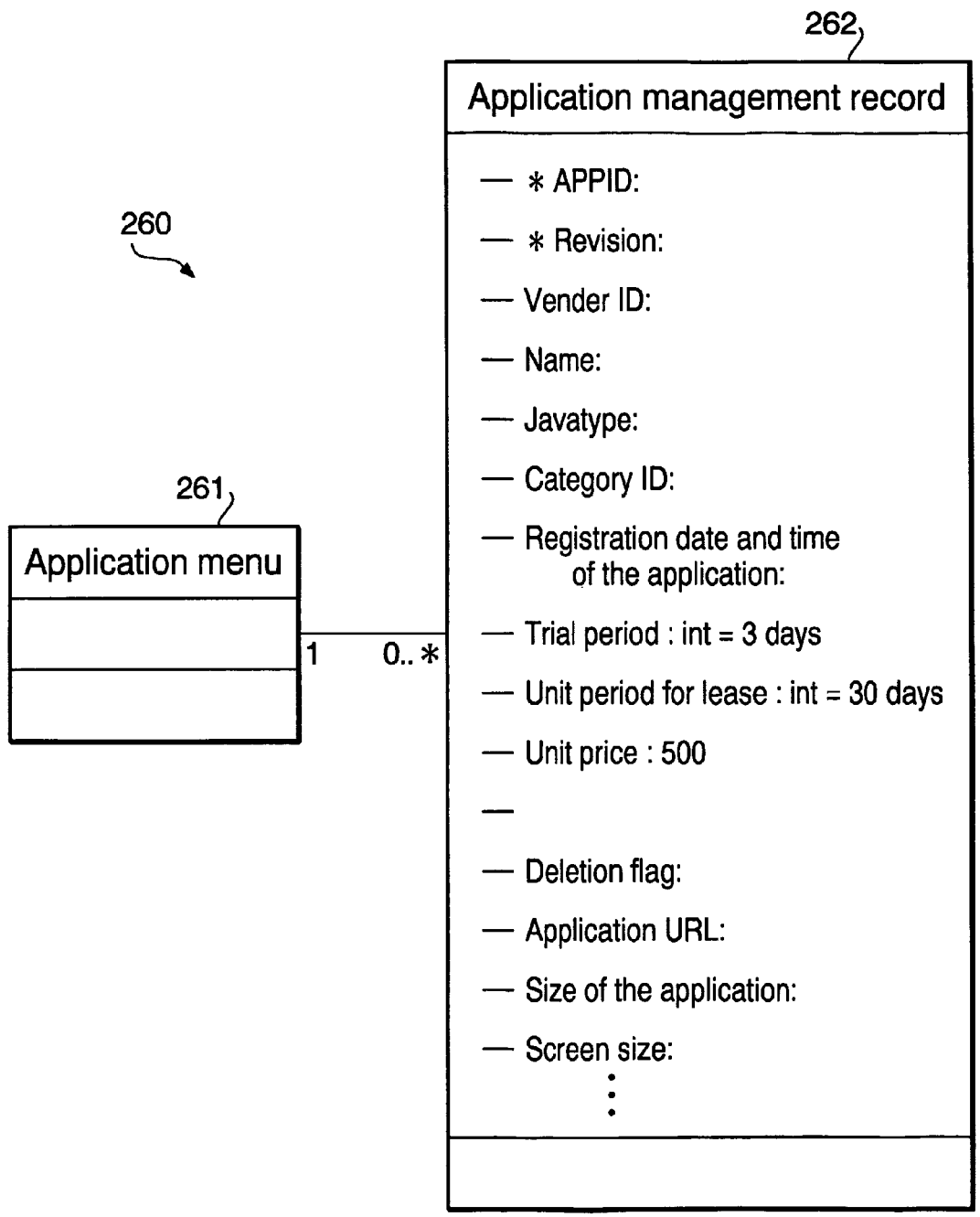
FIG. 6 shows an exemplary configuration of a application database according to the embodiment.

FIG. 6 shows an exemplary configuration of the application database 260, which is held and managed by the management section 230, according to the embodiment.

According to this example, a new application management record 262 is added to an application menu 261 when a new application is registered. The application management record 262 includes an application ID, a revision number of the application, a vender ID, a name of the application (Name), a type of the application (Javatype), a category ID of the application, registration date and time the application, a trial period, a unit period for lease, a unit price for lease, a deletion flag, an application URL (information regarding sites where the application is obtained), a size of the application, a screen size and the like.

The category ID of the application is used for listing the application in the application menu based on categories, which will be described later. The registration date and time is the date and time when the vender formally registered the application. The trial period is a period during which a user can use an application for trial, and is determined for individual application. In the example shown in FIG. 6, the trial period is set to three days. The unit period for lease represents a period for which the user can use the application per one purchase (or update). The unit price represents a price for one purchase (or update).

The deletion flag is a flag which is set to ON when the registration of the application is deleted. It may be possible to delete the application management record itself when the registered application is deleted. According to the embodiment, however, by using the deletion flag, the registration history is kept. The application URL represents the URL (Uniform Resource Locator) indicating a site where the application can be downloaded. The URL may indicate not only the application holder 225 of the management server 220, but also a server provided by the vender of the application or the like.

The screen size represents the size of a display area at the terminal device when the application is used in the terminal device. The screen size information is transmitted when the application is downloaded. The terminal device interprets the screen size information and realizes the indicated screen size.

According to the embodiment, it is assumed that, at one purchase, one unit lease period is purchased. Optionally, according to the user's choice, an integer multiple of the unit period, (that is, (unit lease period)×n, where n is an integer not less than one)), may be purchased at one purchase. In such a case, if the unit period is ten days, and the user purchases three units, the price will be three times the unit price, and the period will be thirty days.

FIG. 7 shows an example of the ADF information 55. As described above, the ADF is a file which is created by the server and transmitted to the terminal device prior to the downloading of the application. The ADF information 55 typically includes an application name (Name), a revision number, a vender ID, an application URL, an application size, an extension version number, an expiration period (Expiration Time), a lease period, the code signing, a screen size and the like.

The extension version and the expiration time are the data set by the server when the application is downloaded, while the other data is copied from the application management record 262 of the application database 260. The usable period is a copy of the lease unit period shown in FIG. 6. It should be noted that if the lease period can be set as a multiple integer of the unit lease period, the lease period is set accordingly. According to the embodiment, as the expiration due, the date and time are designated. Further, when the application is subject to a trial use, characters", trial" are added to the expiration data as an identifier.

Figure 24:
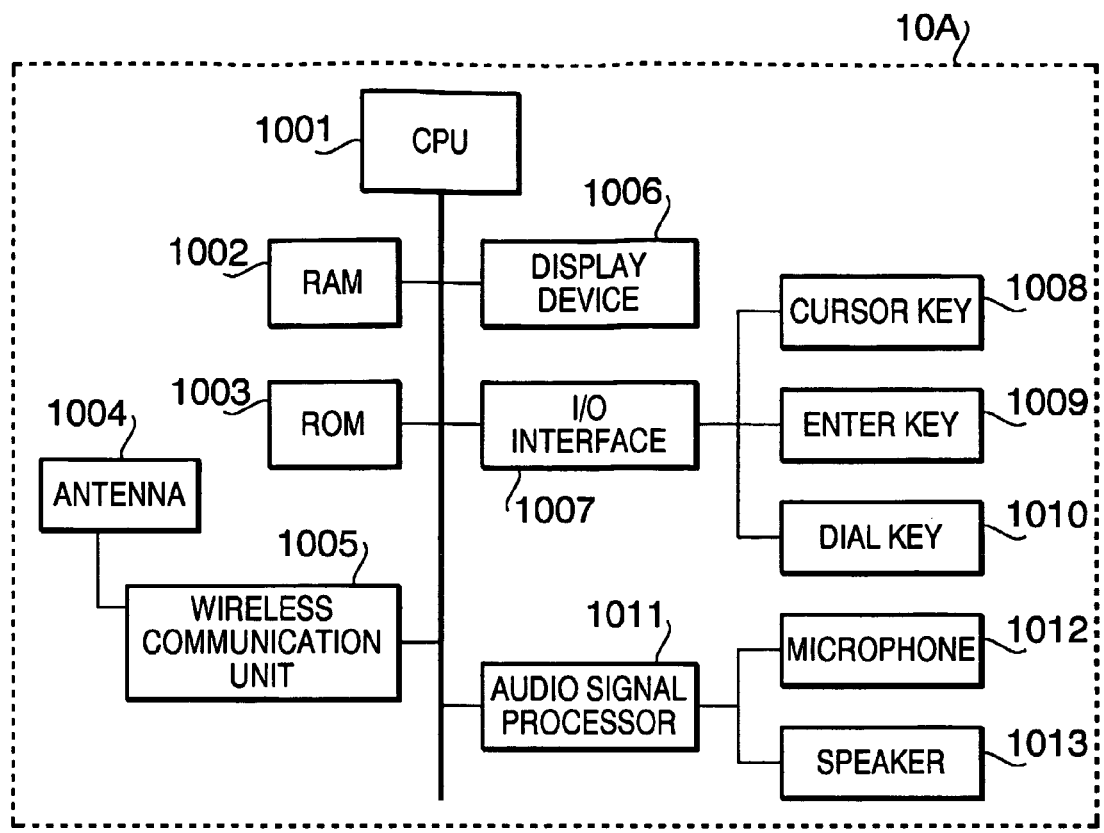
FIG. 24 is a block diagram showing an exemplary configuration of a cell phone.

FIG. 24 shows a hardware configuration of a cell phone 10A which is an example of the terminal device.

As shown in FIG. 24, the cell phone 10A includes a CPU 1001 which controls the entire operation of the cell phone 10A. To the CPU 1001, a RAM 1002, a ROM 1003, a wireless communication unit 1005, an audio processing unit 1011, an I/O interface 1007 and a display device 1006. To the wireless communication unit 1005, an antenna 1004 is connected. Further, a cursor key 1008, an enter key 1009 and dial keys 1010 are connected to the CPU 1001 through the I/O interface 1007. A microphone 1012 and a speaker 1013 are connected to the audio signal processor 1011.

Figure 25:
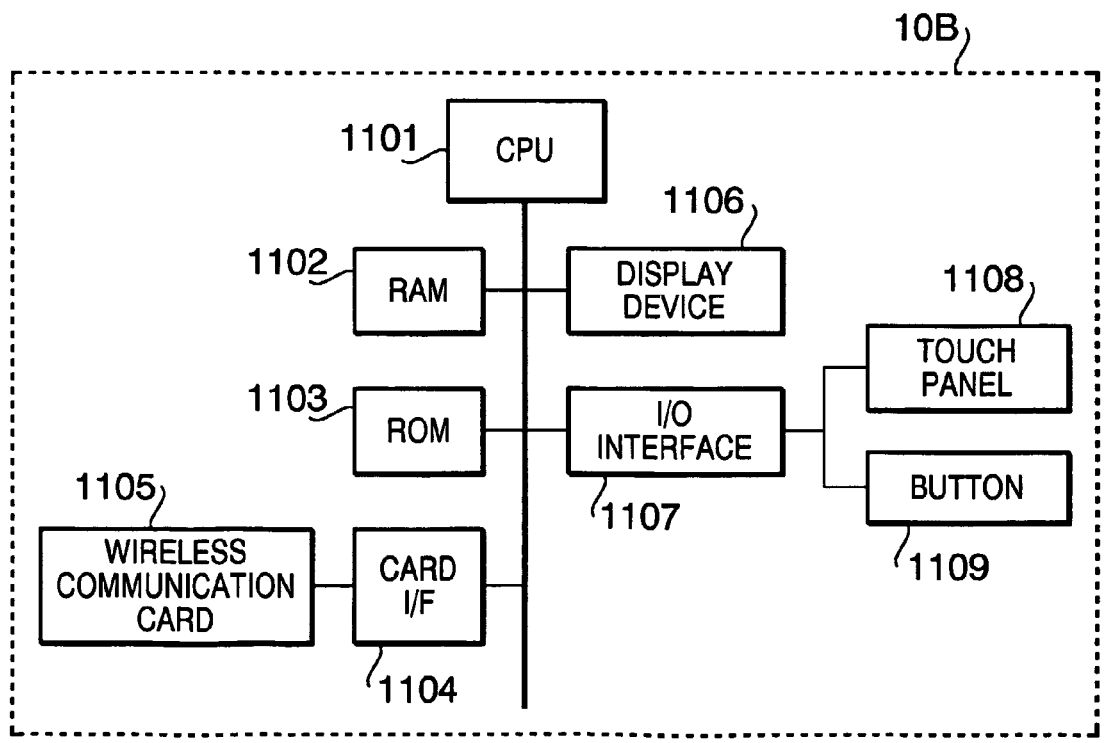
FIG. 25 is a block diagram showing an exemplary configuration of a PDA.

FIG. 25 shows a hardware configuration of a PDA 10B which is another example of the terminal device.

As shown in FIG. 25, the PDA 10B includes a CPU 1101 which controls the entire operation of the PDA 10B. To the CPU 1101, a RAM 1102, a ROM 1103, a CF (compact flash) card I/F 1104, an I/O interface 1107 and a display device 1106 are connected. To the CF card I/F 1104, a wireless communication card 1105 is inserted. Further, a touch panel 1108 and an operational buttons 1109 are interfaced by the I/O interface 1107.

A user selects a menu item to move to a desired screen (i.e., a desired screen image is displayed on the display device 1006 or 1106). A menu item is selected as described below. When the user uses the cell phone 10A, the user operates the cursor key 1008 to move the cursor on the screen of the display device 1006 to locate at a desired menu item. The menu item on which the cursor is located is typically highlighted on the display device 1006. Then, by operating the enter key 1009, the highlighted menu item is selected, and the screen image is switched to an image corresponding to the selected menu item. When the user uses the PDA 10B, the user may select a menu item by tapping a pen on a desired menu displayed on the screen of the display device 1106.

Figure 26:
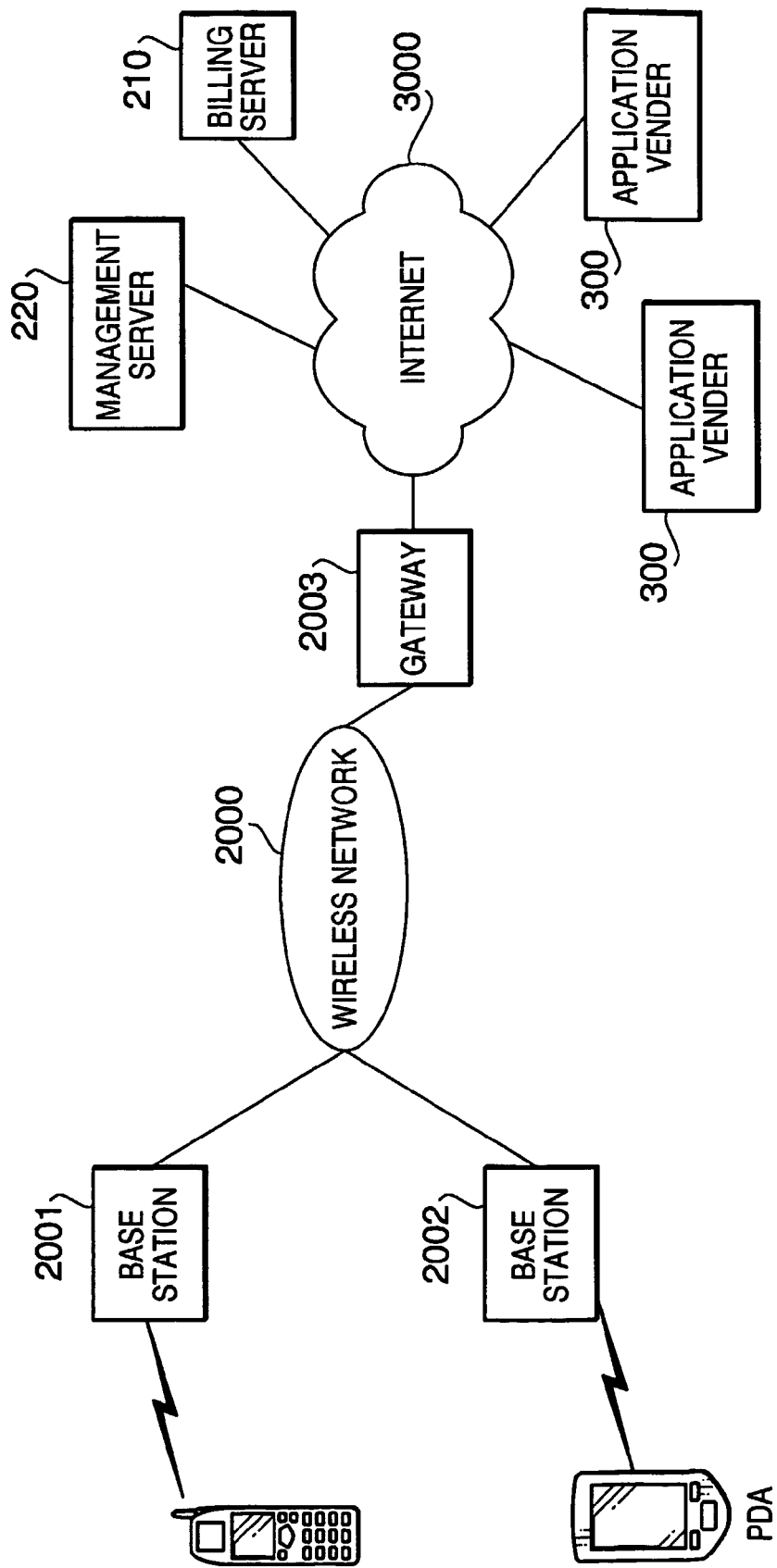
FIG. 26 shows an exemplary system configuration of a management system.

FIG. 26 shows an exemplary system configuration of the management system. The management system includes the cell phone 10A and the PDA 10B which can connect base stations 2001 and 2002, respectively. The base stations 2001 and 2002 are connected with a wireless network 2000, which is a cell phone packet communication network. The wireless network 2000 is connected with the Internet 3000 through a gateway 2003, which converts protocols between the wireless network 2000 and the Internet 3000. The gateway 2003 also functions to bill respective users for the transmitted packets. The application venders 300, the management server 220, the billing server 210 are also connected to the Internet 3000. Thus, in this example, communication between the terminal devices (the cell phone 10A and the PDA 10B) and each of the application venders 300, the management server 220 and the billing server 210 are executed through the wireless network 2000, the gateway 2003 and the Internet 3000. It should be noted that the billing method is not limited to one described above, and another method may be employed. For example, the billing is made with respect to a duration of time for which the user keeps connecting the terminal device to the management server and the like.

Figure 8:
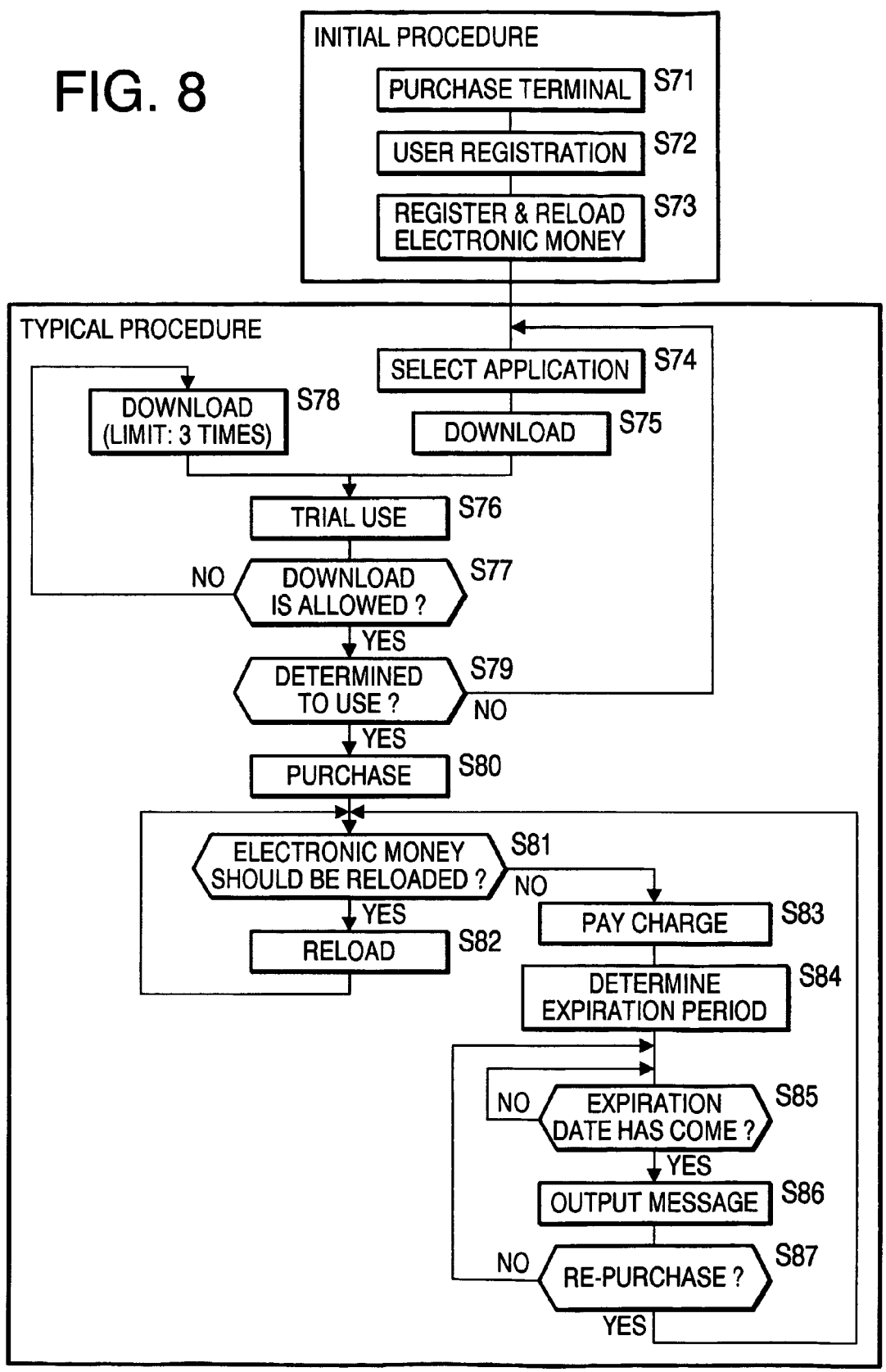
FIG. 8 is a flowchart illustrating a service flow on the user side.

FIG. 8 is a flowchart illustrating a service flow viewed from the user side.

Firstly, the user purchases a terminal device in order to use the above-described service (S71). According to the embodiment, in view of security and the like, terminals which can use the present service are restricted to predetermined ones. The type of the terminal device can be identified by type identifier implanted when the terminal device is shipped from the manufacturer. When the type identifier is not implanted, it may be possible to judge the type of the terminal device based on, for example, user agent information incorporated in an HTTP header transmitted form the terminal device to the server. It should be noted that, in this case, the type of the terminal device is judged from the identifier of the browser installed in the terminal device. The user accesses the portal site using the terminal device and performs a user registration (S72). In S73, the user registers electronic money for an electronic commerce, and reloads the electronic money. The above procedure is an initial procedure and should be executed once at the initial stage.

Next, a normal procedure is executed. In the normal procedure, the user selects a desired application at the portal site (S74), downloads (S75), and uses the same (S76) for trial. According to the embodiment, after the trial period has passed, the user is allowed to download the same application for trial by three times (S77, S78). The number of downloadings can be judged based on the download counter of the my application information of the user database 250 and the purchase counter.

If the user has determined to keep using the application (S79), he/she can purchase the application and obtains a formal right to use the application (S80). When the user purchases the application, if the electrical money should be reloaded in view of the price of the application (S81), the user reloads the electrical money (S82). After the payment of the electrical money (S82), the expiration period for the application is determined ('S84). Although not shown in the drawing, the application can be purchased after the expiration of the trial period.

When the user has purchased the application, countdown of the expiration period starts. When the expiration date has come (S85), a warning message informing the expiration of the period is indicated at the start-up of the application (S86). In response to this message, if the user instructs re-purchase (S87), and pays the charge (S83), the expiration date is reset (S84). It should be noted that, although not shown in the drawing, the extension of the expiration period can be done before the expiration date. In such a case, a new usable period is added to the remaining usable period.

Hereinafter, the operation of the system according to the embodiment will be described in detail.

Figure 9:
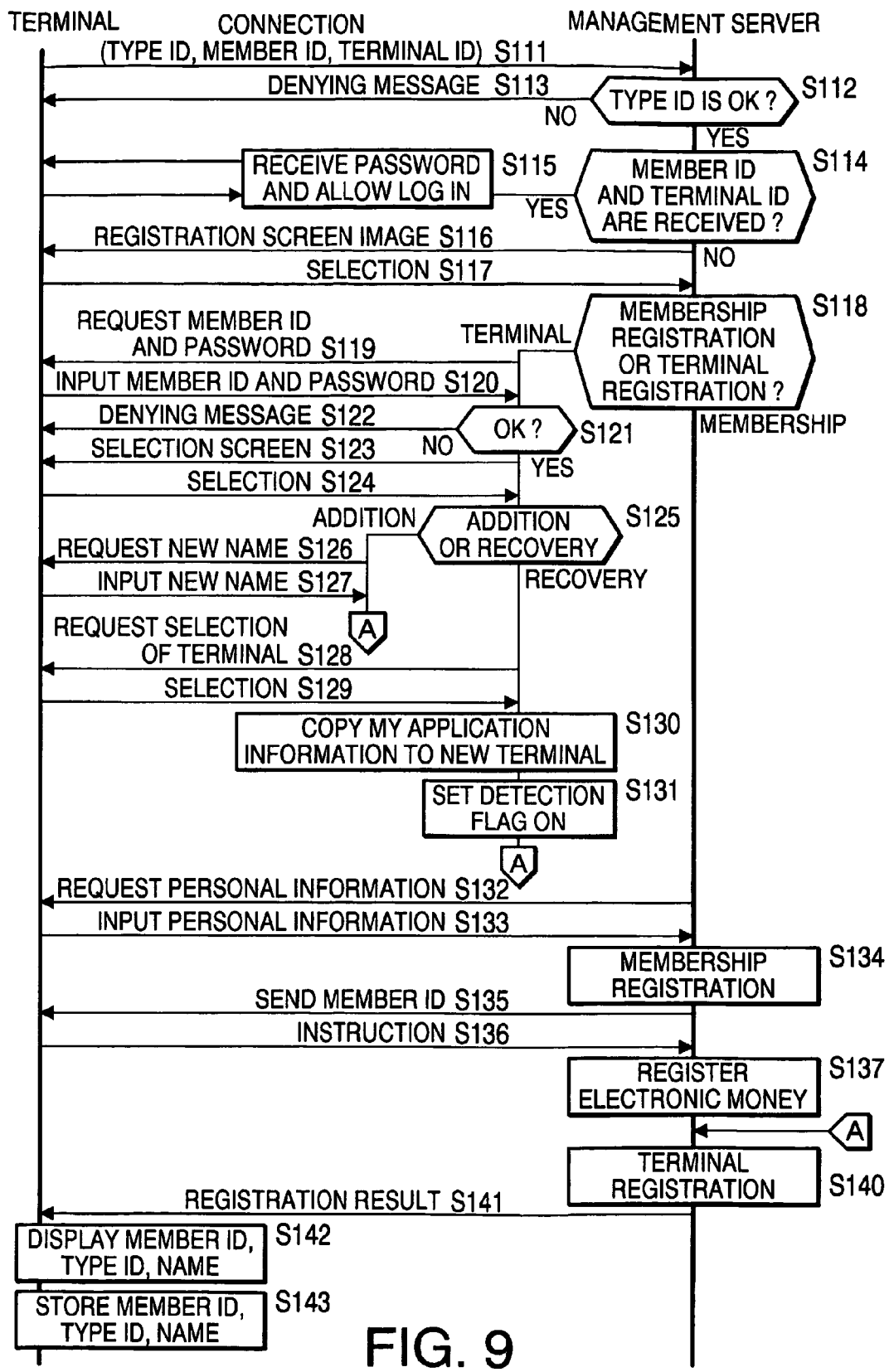
FIG. 9 shows a sequence between the user terminal and the management server for registering a new member.

FIG. 9 shows a sequence between the user terminal and the management server for registering a new member. According to the embodiment, the management server communicates with the terminal device through the Internet using the portal site. The communication typically uses TCP/IP protocol, an http (hyper text transfer protocol), https, or ftp (file transfer protocol) is used for data communication. When the https is used, an SSL (Secure Socket Layer) is used to conceal the communication contents.

As aforementioned, only the predetermined types of terminal devices are used for the present service. When the connection is established, the management server receives, the type ID from the terminal device (S111) to judge whether the terminal device is categorized in the predetermined types (S112). As will be described later, if the terminal device has is a registered device, the member ID and terminal ID stored in the terminal device are also transmitted to the management server when the connection is established. If the type ID is not received or if the received type ID is not one of the predetermined types, a denying message indicating that the service cannot be provided is transmitted from the management server to the terminal device (S113).

If the type ID is OK (i.e., the type ID is one of the predetermined types), it is judged whether the member ID and the terminal ID have been received (S114). If the member ID and the terminal ID have been received, the management server asks a user of the terminal device to input a password. If the input password is correct, the management server allows the user of the terminal device to log in (S115). Procedure after logging in will be described later.

If the member ID and the terminal ID have not been received, it is judged that the terminal being connected is not registered with the present service. In this case, a registration screen image (FIG. 10A) is transmitted to the terminal device (S116). Although not shown in the drawing, even though the management server receives the member ID and the terminal ID, if a combination thereof does not coincide with the registered one, the management server transmits the denying message to the terminal device.

The unregistered member then selects "new member registration" which is a link to a registration page. Such a link is an anchor (i.e., a tag designating the link or procedure) inserted in a markup language file typically represented by HTML (Hyper Text Markup Language) file. When the user selects the anchor, the designated procedure is executed and/or the designated page is displayed. If the user who has already been registered intends to register a new terminal device or when the registered terminal device was broken or lost and the user wishes to have the acquired right of the registered terminal device transferred to a new (or fixed) terminal device, another anchor "for recovery" is to be selected.

Depending on the user's choice (S117), the management server judges whether the new member is to be registered or the new terminal is registered (S118). If the member is registered, as shown in FIG. 10B, the management server requires the user to input personal information including a user name, a password, an e-mail address, a mail address, a name of the terminal and the like, and assign a member ID to the user as shown in FIG. 10C, end register the member with the membership database (S134). Then, the management server transmits the assigned member ID to the user (S135). Next, the management server receives an instruction for registering the electronic money (S136), and performs an electronic money registration procedure including the opening of the electronic money account (S137). Further, the management server assigns a terminal ID to the terminal device used by the user, and registers the terminal ID, in relationship with the name of the terminal device, with the membership database (S140). Thereafter, as shown in FIG. 10D, the management server notifies the registration results to the user (S141), and guides the user to move into the log-in screen.

When the terminal registration is requested by the user (S118), as shown in FIG. 11A, the management server requires the user to input the member ID and the password (S119), and based on the input data (S120), authenticates the member (S121). Then, as shown in FIG. 11B, the management server asks the user to select the addition of a terminal device or recovery of the terminal device (or transfer the right) (S123, S124). If a terminal device is added (S125), the management server requires the user to input a new name of the terminal device (S126, S127) as shown in FIG. 11C, and control moves to the terminal registration procedure (S140).

If it is judged that the recovery of the terminal device is to be performed in S125, the recovery procedure is performed. Specifically, as shown in FIG. 11E, the management server asks the user to select a terminal by its name (S128) to identify the terminal device subject to the recovery based on the user's choice (S129). Then, the management server copies (S130) the "my application information" 254 (see FIG. 4) of the selected terminal device to the "MY MENU" 253 (see FIG. 4) of the new terminal device, and set the deletion flag of the terminal device designated by its name ON (S131). Thereafter, similar to the above, the terminal device registration procedure is executed (S140).

After the terminal device registration procedure is finished, the management server transmits the member ID, terminal ID, type ID and the name of the terminal device to the terminal device (S141). Preferably, in order to have the user to know the registered contents, the member ID, the type ID and the name of the terminal device are displayed on the display of the terminal device (S142). It should be noted that the terminal ID is hidden even for the member, and is stored in a local storage of the terminal device in association with the name of the terminal (S143). According to the embodiment, the terminal device is not provided with measure to have the user access the ID data above.

Figure 12A:
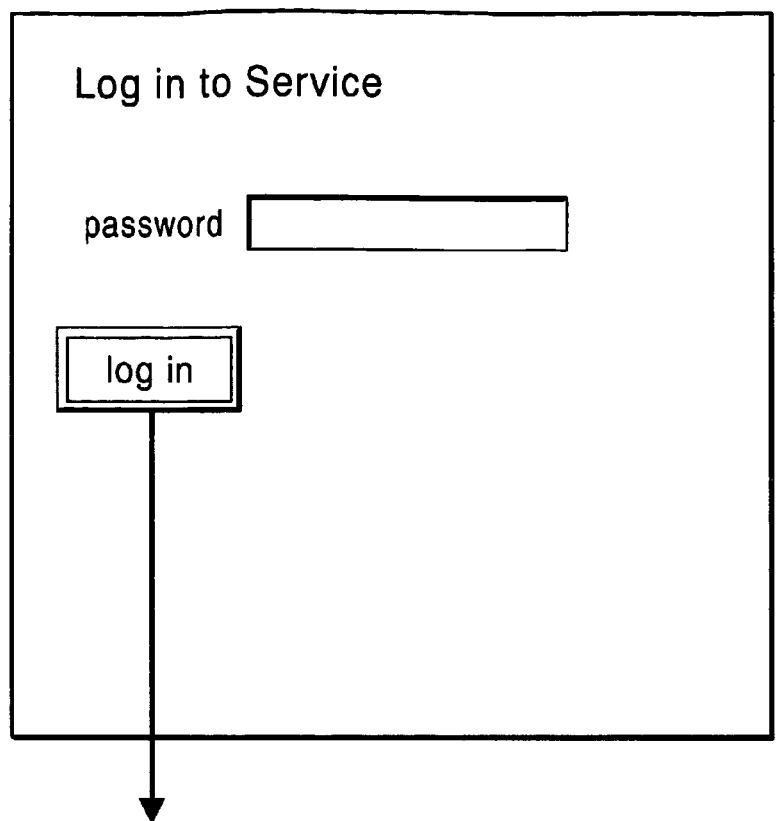
FIGS. 12A and 12B show images displayed on the user terminal.
Figure 12B:
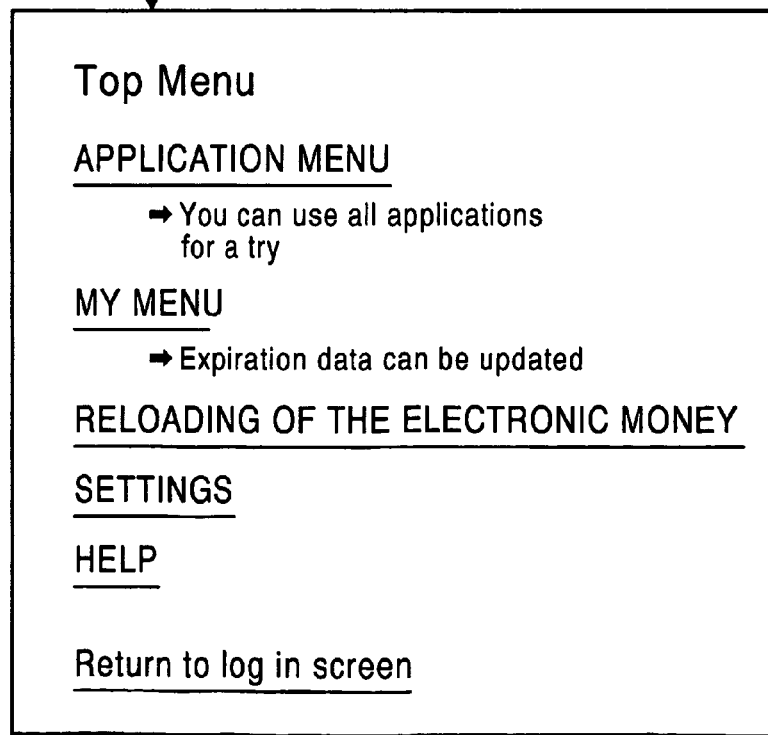

FIGS. 12A and 12B show images displayed on the user terminal. Specifically, FIG. 12A shows a log-in image and FIG. 12B shows an image of Top Menu. The top menu shows menu items of "application menu", "MY MENU", "reloading of electronic money", "settings", "help" and the like as anchor points.

The "application menu" provides all the applications provided by the service, and the user can select applications from among the displayed ones and use the same for trial. The "MY MENU" is a menu in which the applications selected by the user are registered as an application group. The user is capable of purchasing or extending the expiration period of each application included in the group. According to the embodiment, it is possible to extend the expiration period during or after the expiration of the period. It is also possible to re-try the application included in the "MY MENU" after the expiration period thereof. It should be noted that the number of re-trial usages is limited. Examples of the application menu and the MY MENU will be described in detail later. The "reloading of the electrical money" is an item for reloading the electrical money prior to the payment for applications. The "settings" menu is used for updating the member information and/or certification.

Figure 13:
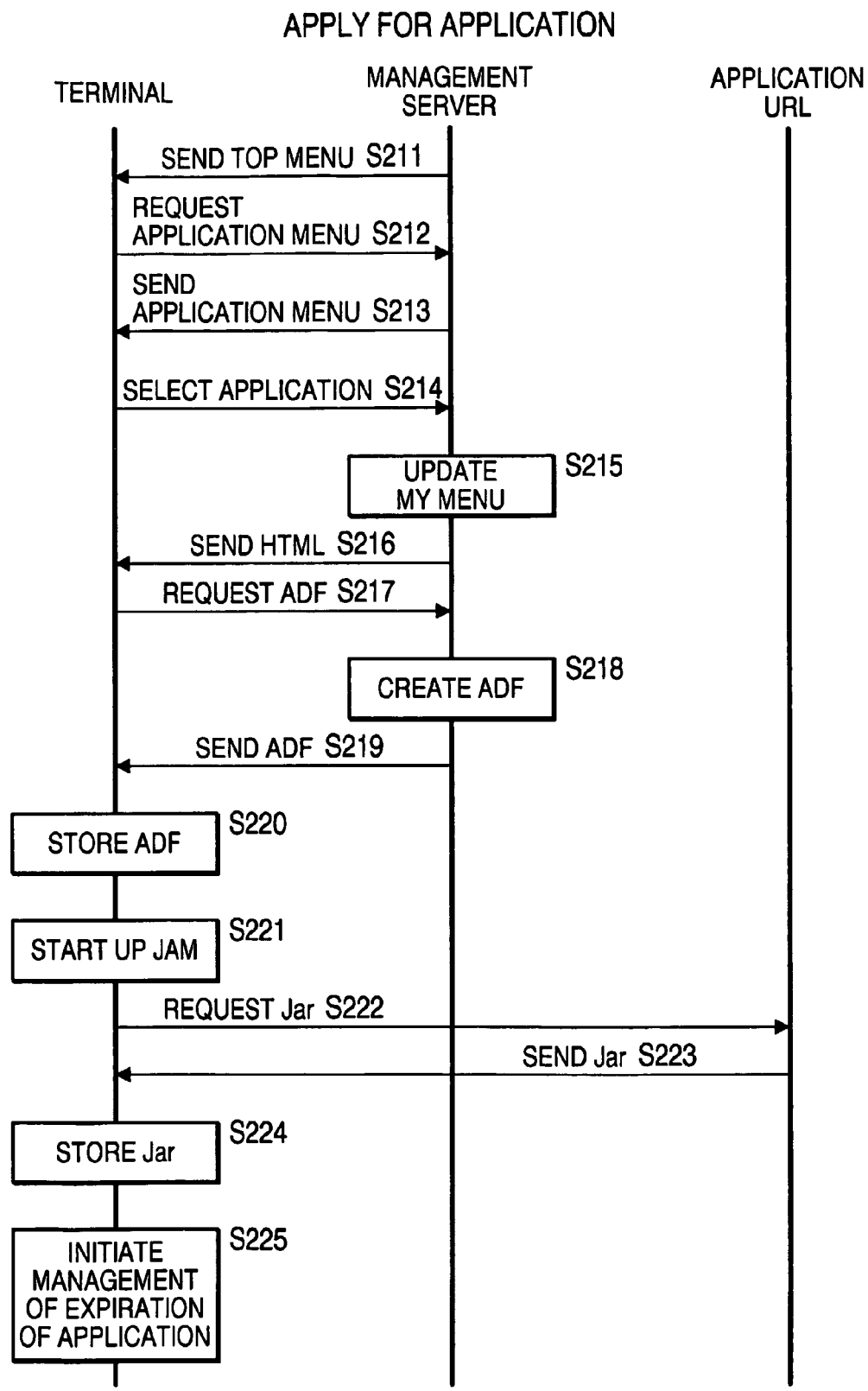
FIG. 13 is a sequence diagram illustrating a procedure when a user applies for an application through an application menu.

FIG. 13 is a sequence diagram illustrating a procedure when a user applies for an application through an application menu.

The management server transmits the top menu to the terminal device (S211), and receives a request for the application menu from the terminal device (S212), and transmits the application menu (S213) to the terminal device. If the user selects an application, data identifying the selected application is transmitted to the management server (S214). In response to the identifying data, the management server registers the selected application with the "MY MENU" of the user as one of "my applications" (S215). The management server further transmits an HTML file including a "GET ADF" command to the terminal device (S216). The HTML file may be any file, for example, a file informing the terminal device of the registration results. The terminal device interprets the received HTML, and without the user's instruction, returns the "GET ADF" command to the management server to request the management server to transmit the ADF file (S217). In response to the "GET ADF" command, the management server interprets the same and creates an ADF as described with reference to FIG. 7 with respect to the application currently selected by the user. When the ADF is created, the expiration period is incorporated in the ADF. The expiration period is determined such that, for example, the date (and time) of the trial usage requested is regarded as the start point, and the expiration data (and time) is determined based on the expiration period as registered. The thus created ADF is transmitted to the terminal device (S219).

The terminal device stores the received ADF in the local storage and analyzes the same (S220). Then, the terminal device starts up the JAM (S221). The JAM requests, in accordance with the description of the ADF, the site indicated by the application URL for the Jar file, which is the main program of the application (S222). As aforementioned, the application URL may be the application holder in the management server, the download site of the application vender, or anywhere else where the application is available. Optionally, if the ADF does not include an application URL and/or the application URL indicated by the ADF is not found, a predetermined site may be regarded as the downloading site. When the Jar file is transmitted from the site indicated by the application URL to the terminal device (S223), the terminal device receives the file and stores the same in the local storage (S224). Then, the management of the expiration of the application is initiated (S225).

Figure 14A:
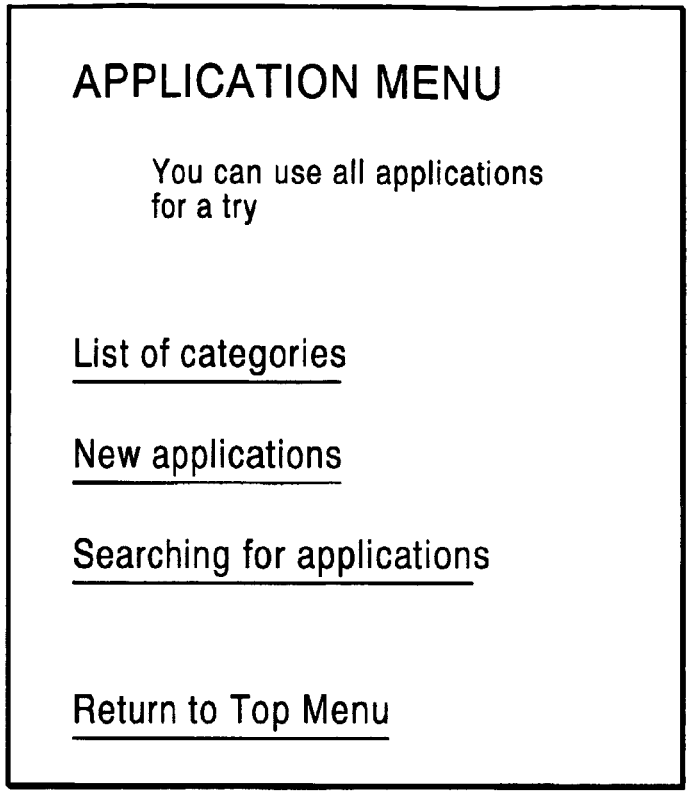
FIG. 14A shows an image of an application menu and FIG. 14B shows an image of a list of categories displayed on the user terminal.
Figure 14B:
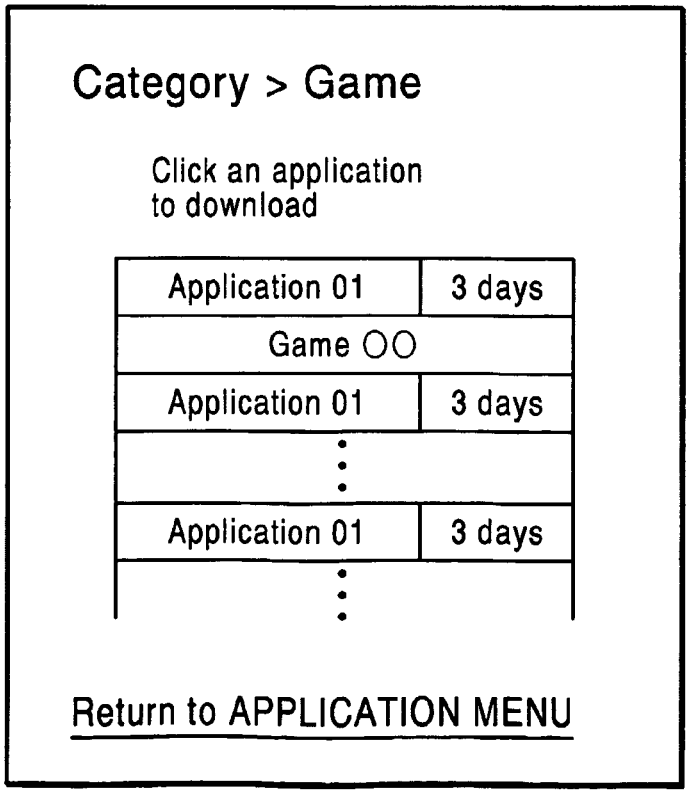

FIG. 14A shows an example of an image of an application menu transmitted by the management server to the terminal device. In this application, the application menu includes menu items of "list of categories", "new applications", "searching for application" and the like. In FIG. 14B an exemplary image of a list of applications is displayed on the user terminal. In this example, an image when a game category is selected from the lis't of categories is shown. Further, in this example, a name of each game application, a trial period and a brief description of each application are included. When the user designates one of the listed applications, as described above with reference to FIG. 13, downloading of the application is initiated.

Now, with reference to FIGS. 15A through 15E, transition of images when the usage period is updated from the MY MENU will be described. FIGS. 15A through 15E show transition of displayed images when the user applies for updating (including purchasing) of the expiration period through the MY MENU.

FIG. 15A shows an example of the MY MENU. In the example in FIG. 15A, menu items of "download" and "updating" are displayed.

The item "download" is selected, for example, when the user intends to apply for re-trial of the application after the trial period has expired. When the item "download" is selected, the displayed image changes to one shown in FIG. 15B, for example. By selecting one of listed applications, the user is capable of downloading a trial application with a new ADF therefor to extend the trial period. In this example, the usage is in the trial stage, no fees are required.

When the user select an application, the displayed image changes as shown in FIG. 15E, which indicates that the application is being downloaded.

When the "updating of period" is selected, the displayed image changes as shown in FIG. 15C. On the display, the list of the application the user has once purchased are listed, and the user can update the expiration date (and time) of any one of the listed applications. It should be noted that the "updating" includes the extension of the usage period of the applications and re-purchase of the applications whose usage periods have expired. When the usage period is extended, the newly provided period is added to the remainder of the usage period of the application in use. For "updating" the period, accounting is performed, and for this purpose, the displayed image changes to one as shown in FIG. 15D. In the exemplary image shown in FIG. 15D, the name of the application, the price of the purchase and change of the electronic money are displayed so that the user can confirm the same. When the user confirms, the new ADF file including the updated expiration date (and time) is transmitted to the terminal device as well as the application (FIG. 15E).

Although not shown in the drawings, in the "MY MENU" shown in FIG. 15A, an item "organization of MY MENU" maybe optionally provided. By selecting the "organization" item, unnecessary my applications can be deleted.

Figure 16:
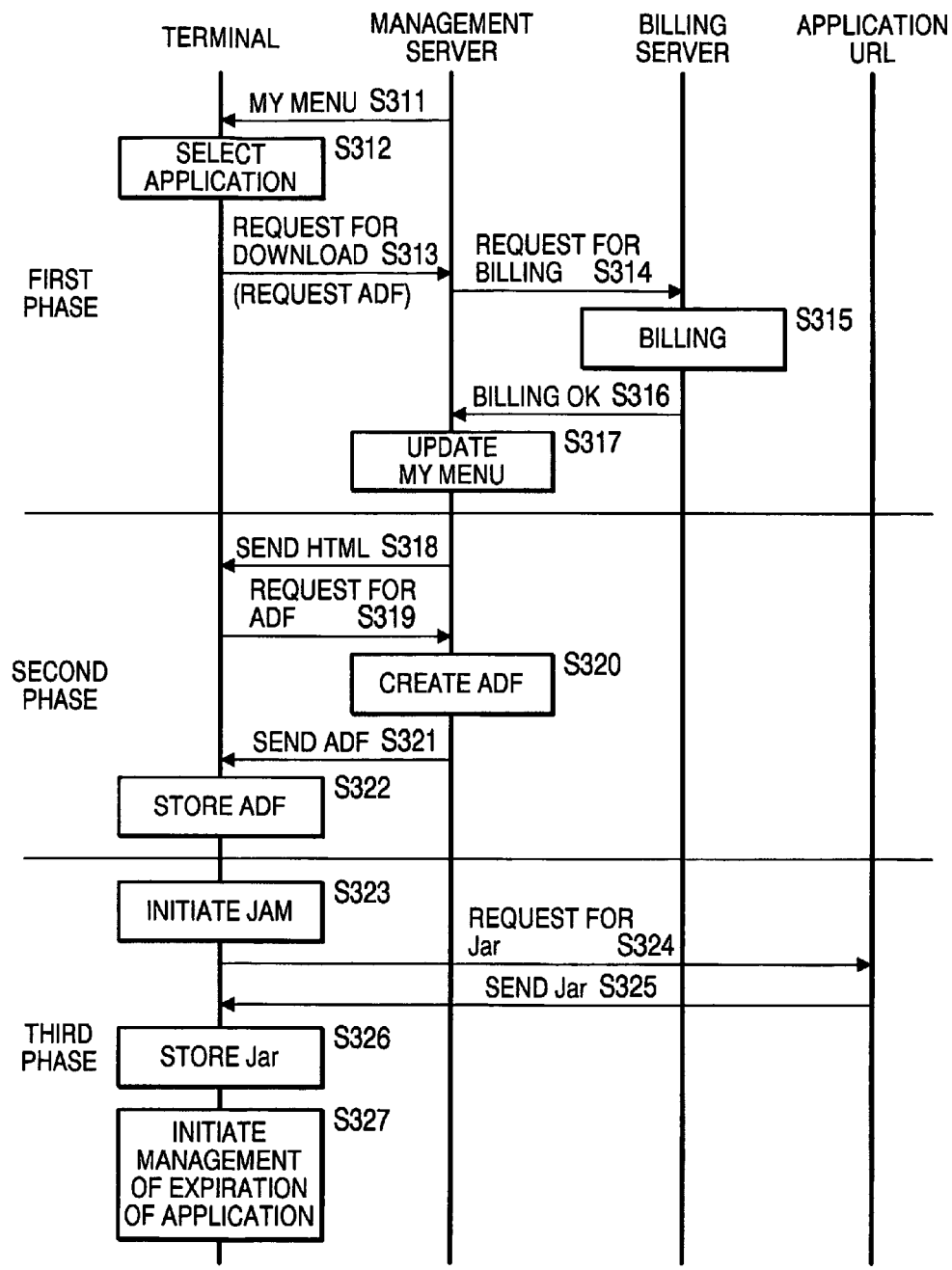
FIG. 16 is a sequence diagram illustrating three phases of management of applications according to the embodiment.

FIG. 16 is a sequence diagram illustrating three phases of management of applications according to the embodiment.

When the user refers to the MY MENU transmitted from the management server (S311) and selects a desired application (S312), information identifying the application and a download request are transmitted from the terminal device to the management server (S313). The request also includes a request for a new ADF file. The management server transmits a billing request regarding the application to the billing server to bill the user (S314). The billing server performs a billing procedure in response to the billing request transmitted from the management server (S315). When the billing procedure is successfully performed, a notification indicating the billing is successfully done is transmitted from the billing server to the management server (S316). The management server updates the MY MENU corresponding to the terminal device of the user after the completion of the billing procedure is confirmed (S317). The steps S311 through S317 are a first phase of the updating application procedure.

Then, the management server transmits the HTML file including the "GET ADF" command to the terminal device (S318) as aforementioned. The terminal device analyzes the HTML and, without the user's instruction, transmits the "GETADF" command to the management server to request for transmission of the ADF file (S319). In response to the "GET_ADF" command, the management server creates the ADF regarding the selected application (S320). When the ADF is created, the expiration period is incorporated in the ADF. The expiration period is determined such that, for example, the date (and time) of the punches request is regarded as the start point. If there are remaining period in the current usage period, the expiration date (and time) of the usage is determined with adding the remaining period. Then, the created ADF is transmitted to the terminal device (S321). The steps from S319 to S321 are second phase of the updating application procedure.

In the following phase (i.e., a third phase) of the updating application procedure, the terminal device stores the received ADF in the local storage and analyzes the same (S322). Then, the terminal device starts up the JAM (S323). The JAM requests a site indicated by the application URL included in the ADF for a Jar file, which is the main body of the application (S324). Then, the Jar file is transmitted form the application URL site to the terminal device (S325). The terminal device receives the transmitted Jar file and stores the same in the local storage (S326), and starts management of the usage period (S327).

With above configuration, the following advantages are available.

(1) If every procedure is performed normally without any problem, purchase request, billing and downloading the application are executed as a series of procedures as if they are a single process. Further, the only operation performed by the user is the purchase request, and no further operation by the user is transparent to the user and need not be executed by the user.

(2) In the first phase, after the purchase request command is transmitted from the terminal device to the management server, the process is executed only between the management server and the billing server. Therefore, the stability of the system is relatively high. Further, there is no possibility of interruption of the first phase due to communication errors between the terminal device and the management server.

(3) There might be some communication error between the terminal device and the management server. However, if the first phase is completed, even if the communication error occurs between the terminal device and the management server, re-execution of the second and the third phase is sufficient. That is, if the user select the "download" menu from the MY MENU to obtain the ADF file and the Jar file. Therefore, double billing will not occur even if the communication error occurs.

(4) In the second phase, the files the terminal device is to receive are the main body of the application (i.e., the Jar file) and the ADF file, both of which are relatively small files. Thus, there is no possibility that the session including the billing operation is interrupted due to exchange of large files.

(5) In the third phase, if the Jar file is relatively large, a communication error may occur between the terminal device and the vender (or the application holder). In such a case, the Jar file may not be successfully downloaded. Such a possibility is larger if the terminal device is a mobile type device. In such a case, however, only the third phase can be re-executed. Specifically, if the Jar file is not completely downloaded, since the ADF file has been downloaded, the name of the application is included in the play list. When the user tries to start up the application, an error occurs since the application itself has not yet successfully downloaded. In such a case, as an error procedure, the system may be configured such that the terminal device connects the site indicated by application URL to download the application. If the application URL is not the management server (e.g., the download site of the vender), the management server does nothing regarding the re-downloading the application, which significantly decreases burdens of the management server in re-downloading the application. Such an advantage is more significant if the size of the application is larger.

In order to prevent the double billing, the procedure may be modified such that the billing is performed after the terminal device has completed downloading the application (i.e., Jar file). However, in such a configuration, the management server must await billing operation throughout the first to third phases. According to the above-described embodiment, the management server need not wait throughout the first to third phases, and thus burden of the management server is decreased. As can be appreciated easily, if the first phase has been completed, the double billing never occurs, and the management server need not check whether the third phase is completed or not.

Further, within the usage period, the user is allowed to download the application any number of times. In other words, the second phase and third phase are independent from the billing procedure. Thus, it is ensured that the user can obtain the application without a possibility of the double billing. Therefore, if the local storage is full of data, the user can delete the application to make space for some other purpose, and when it becomes necessary, the user can execute the second and third phases to download the application again for use without being billed again. In this point of view, the user can use the site indicated by the application URL as a virtual storage of the terminal device.

Figure 27:
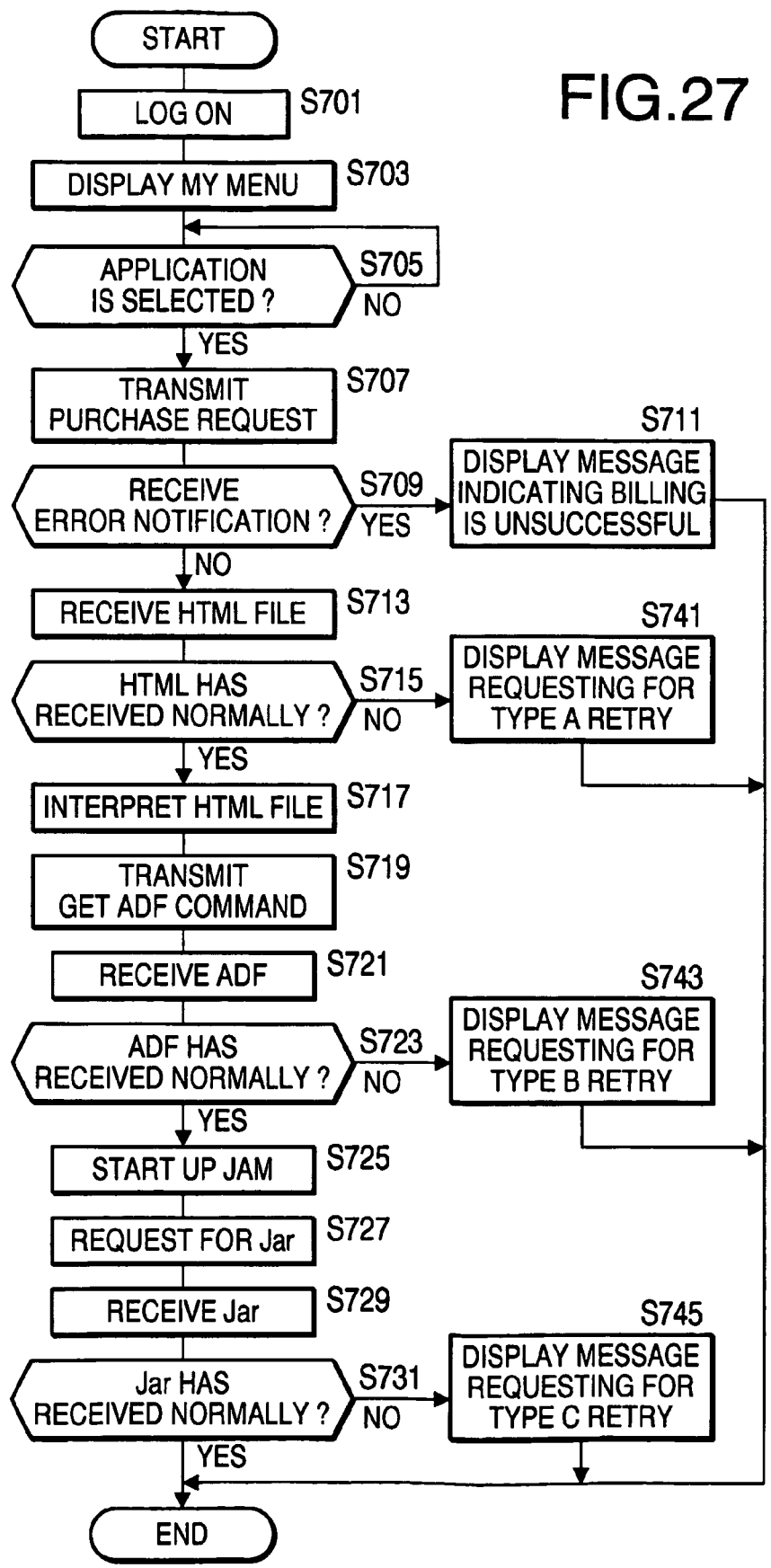
FIG. 27 is a flowchart illustrating an operation of a terminal device.

FIG. 27 is a flowchart illustrating an operation of the terminal device described above in detail.

When the user starts the browser and logs on the service (S701), the MY MENU transmitted from the management server is displayed (S703). Then, the user may select an application (content) from among the listed applications (contents) (S705). When an application is selected (S705: YES), the terminal device transmits a purchase request to the management server (S707). As described above, the management server performs the billing procedure upon receipt of the purchase request, and then transmits the notification indicating whether the billing has been successfully completed or an error has occurred. If the billing is unsuccessful, i.e., if the terminal device receives an error notification (S709: YES), a message indicating that the billing procedure was unsuccessful is displayed on the display device of the terminal device (S711). In this case, the user needs to start the procedure shown in FIG. 27 from the beginning. If the billing was successful (S709: NO), the procedure proceeds from the first phase to the second phase, and the terminal device receives an HTML file from the management server (S713).

In S715, it is judged whether the HTML file is successfully received. If there is a communication error or the like during transmission of the HTML file, a TCP/IP protocol processing program, which runs in a lower layer than the browser, issues an error notification, thereby the terminal device can judge that the HTML file has not been received normally (S715: NO). In this case, a message indicating that a type A retry procedure should be performed (S741), and procedure shown in FIG. 27 is terminated. As aforementioned, since the billing procedure has been completed successfully, only the second and third phase procedures are sufficient to download and use the application. The type A retry procedure will be described later.

If it is judged that the HTML file has been successfully received (S715: YES), the CPU of the terminal device interprets the HTML file (S717) and transmits the "GET ADF" command to the management server (S719). As described above, the management server creates the ADF upon receipt of the "GET ADF" command from the terminal device, and transmits the same to the terminal device. In S721, the terminal device receives the ADF.

In S723, it is judged whether the ADF is successfully received. Similarly to step S709, if there is a communication error during transmission of the ADF, the TCP/IP protocol handling program issues an error notification, with which the terminal device judges that the ADF has not been received successfully. In such a case. (S723: NO), control proceeds to S743, where a message indicating that a type B retry should be performed. At this stage, since the HTML file has been correctly received, the retry may be started from transmitting the "GET_ADF" command. The type B retry procedure will be described later.

When it is judged that the ADF has been received successfully (S723: YES), control proceeds to S725. At this stage, control proceeds from the second phase procedure to the third phase procedure.

In S725, the terminal device starts up the JAM, which request a site indicated in the ADF for a Jar file (S727). In this case, the download site transmits the Jar file upon request from the terminal device. The terminal device receives the Jar file in S729.

In S731, it is judged whether the Jar file has been received successfully. If there is a communication error or the like, and the Jar file has not been received successfully, control proceeds to S745, where a message indicating a type C retry procedure should be performed is displayed on the display device of the terminal device. At this stage, since the ADF has been received, the procedure is restarted from transmitting of the Jar file request. That is, since the ADF has been received, the application is listed in the play list. However, if the body of the application has not been received, then the downloading procedure for the Jar file should be re-executed.

If the Jar file has been received successfully (S731: YES), the downloading procedure shown in FIG. 27 is completed. Thereafter, the management of the downloaded application should be done as aforementioned.

According to the embodiment, the retry procedures are initiated by the user. It may be possible to modify the procedures such that the retry procedures are automatically performed when the communication error is detected. However, the communication error may be caused due to a bad condition of the radio wave. In such a case, it is preferable that the retry is performed after the user (i.e., the terminal device) is located at a position where the radio wave strength is sufficient. It may be possible that the terminal device judges whether the retry procedures are to be performed automatically or manually depending on the strength of the radio wave.

Figure 28:
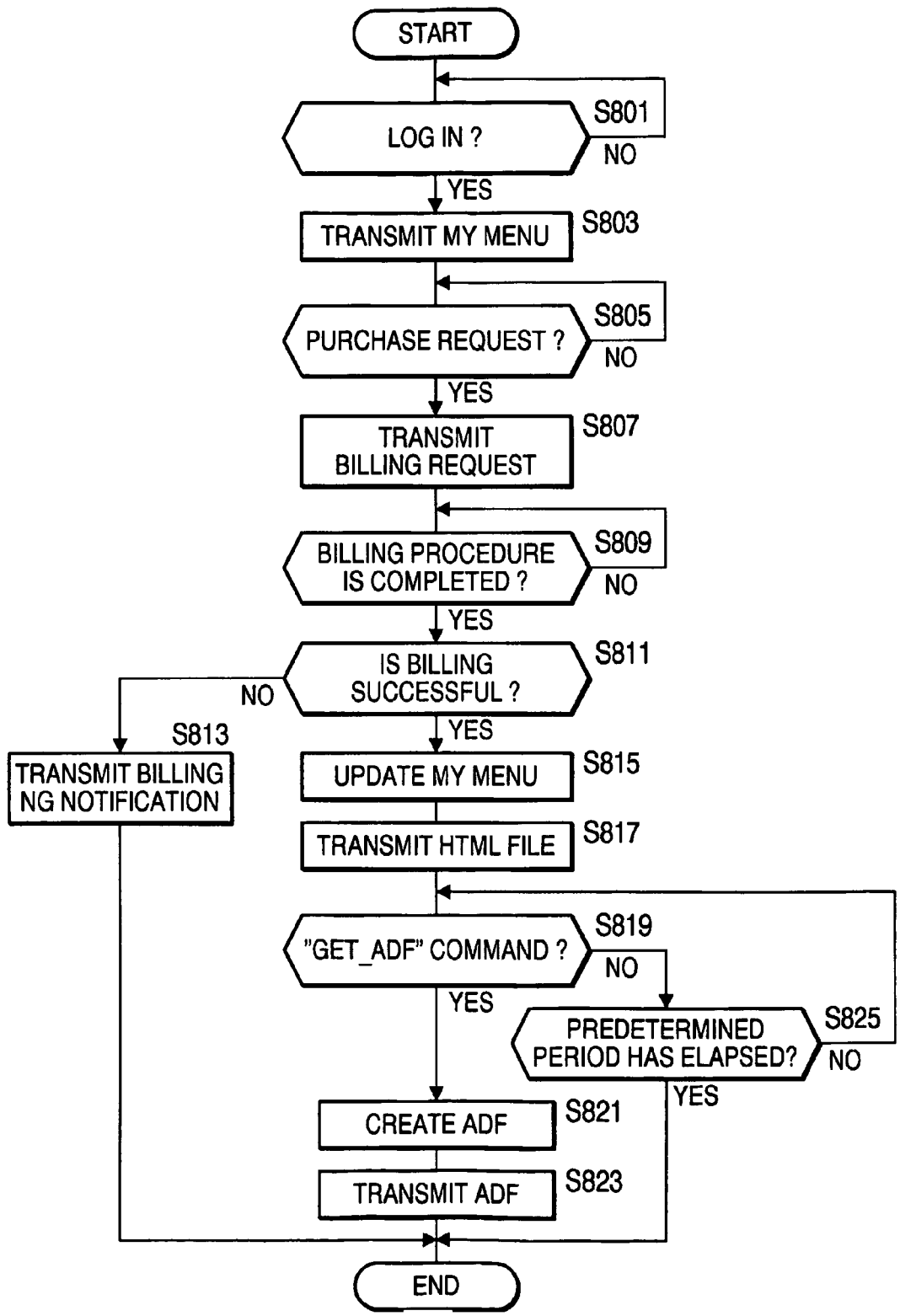
FIG. 28 shows a flowchart illustrating the operation of the management server corresponding to the operation of the terminal device shown in FIG. 27.

FIG. 28 shows a flowchart illustrating the operation of the management server corresponding to the operation of the terminal device shown in FIG. 27.

When the terminal device logs in (S801: YES), the management server transmits the MY MENU (S803). If the purchase request is transmitted from the terminal device (S805: YES), the management server transmits a billing request to the billing server (see S314 of FIG. 16). In S809, the management server waits for completion of the billing procedure. If the billing procedure has been completed unsuccessfully (S811: NO), the management server transmits a billing NG notification to the terminal device (S813). If the billing procedure has been completed successfully (S811: YES), the management server updates the MY MENU to add the new application (content) (S815).

Then, control proceeds from the first phase procedure to the second phase procedure, and transmits the HTML file embedded with the "GET_ADF" command to the terminal device (S817).

As described above, the terminal device receives the HTML file, and returns the "GET_ADF" command.

The management server waits for the receipt of the "GET_ADF" command from the terminal device for predetermined period (S819, S825). If the predetermined period has elapsed without receiving the "GET_ADF" command from the terminal device (S825: YES), the procedure shown in FIG. 28 is terminated. In this case, therefore, the ADF has not been transmitted to the terminal device.

If the management server receives the "GET_ADF" command from the terminal device (S819:YES), the management server creates the ADF (S821), and transmits the same to the terminal device (S823), and the procedure shown in FIG. 28 is finished.

Figure 29:
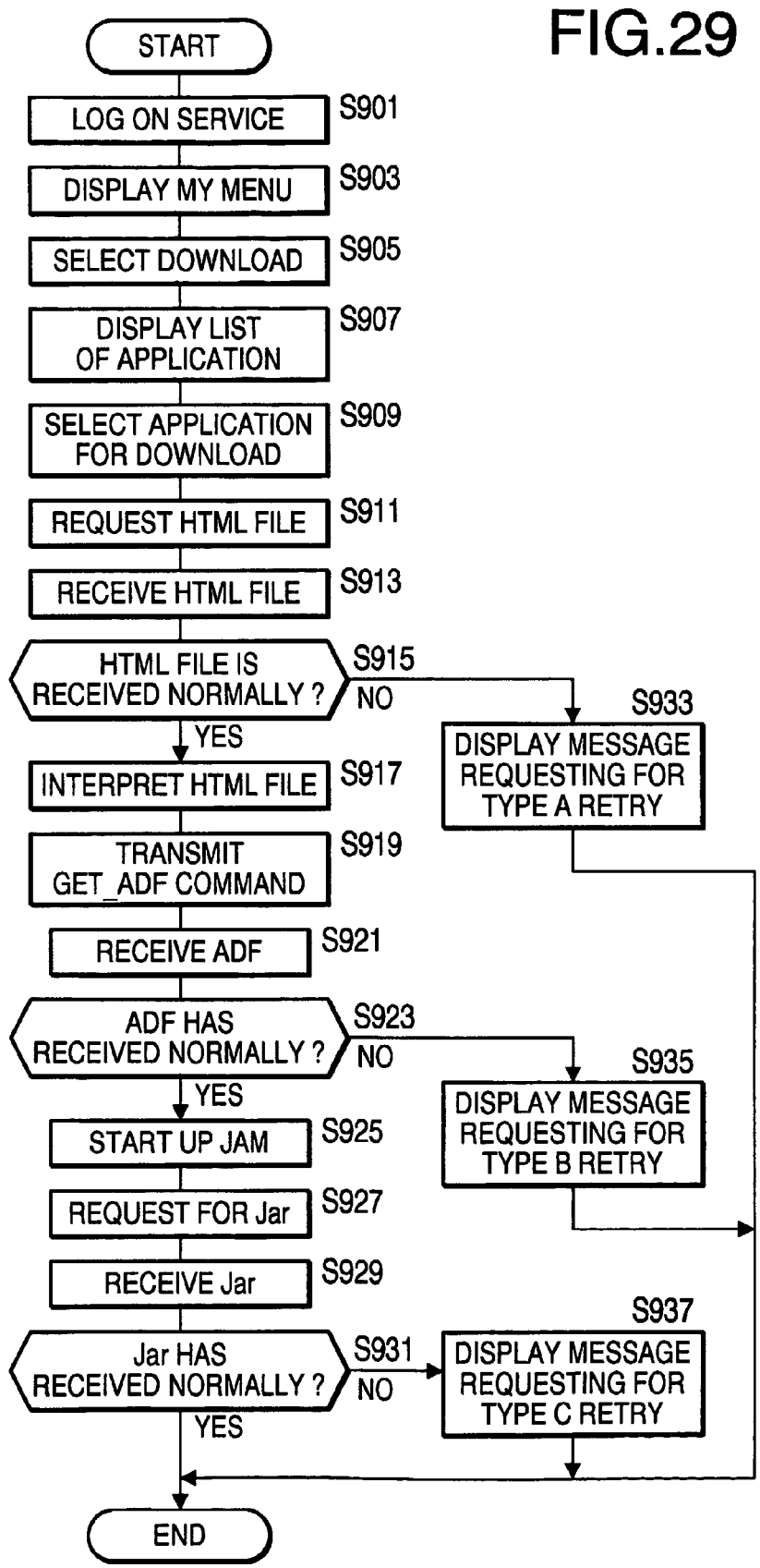
FIG. 29 shows a flowchart illustrating a type A retry procedure according to the embodiment.

FIG. 29 shows a flowchart illustrating the type A retry procedure according to the embodiment.

As described above, when the communication error occurs when the terminal device is receiving the HTML file, the type A retry procedure should be performed.

When the user starts the browser and logs on the service (S901), the MY MENU transmitted from the management server is displayed (S903). At this stage, the user selects downloading of an application (S905). Then, a list of applications is displayed on the display device of the terminal device (S907). The user selects the application for which the billing procedure has been finished (S909). When the application is selected, the terminal device transmits a request to the management server for the HTML file corresponding to the selected application (S911).

The management server transmits the HTML file in response to the request received from the terminal device.

In S913, the terminal device receives the HTML file transmitted from the management server. It is then judged whether the HTML file has been received successfully (S915).

If the HTML file has not been received successfully (S915: NO), control proceeds to S933, where a message indicating the type A retry procedure should be performed.

If the HTML has been successfully received (S915: YES), control proceeds to S917. Steps S917 through S931, S935 and S937 are similar to steps S717 through S731, S743 and S745 of FIG. 27, and therefore, description thereof will not be repeated.

As described above, when the billing procedure has been completed, it is not necessary to perform the first phase procedure, and the user may download the file without performing procedures related to the billing.

Figure 30:
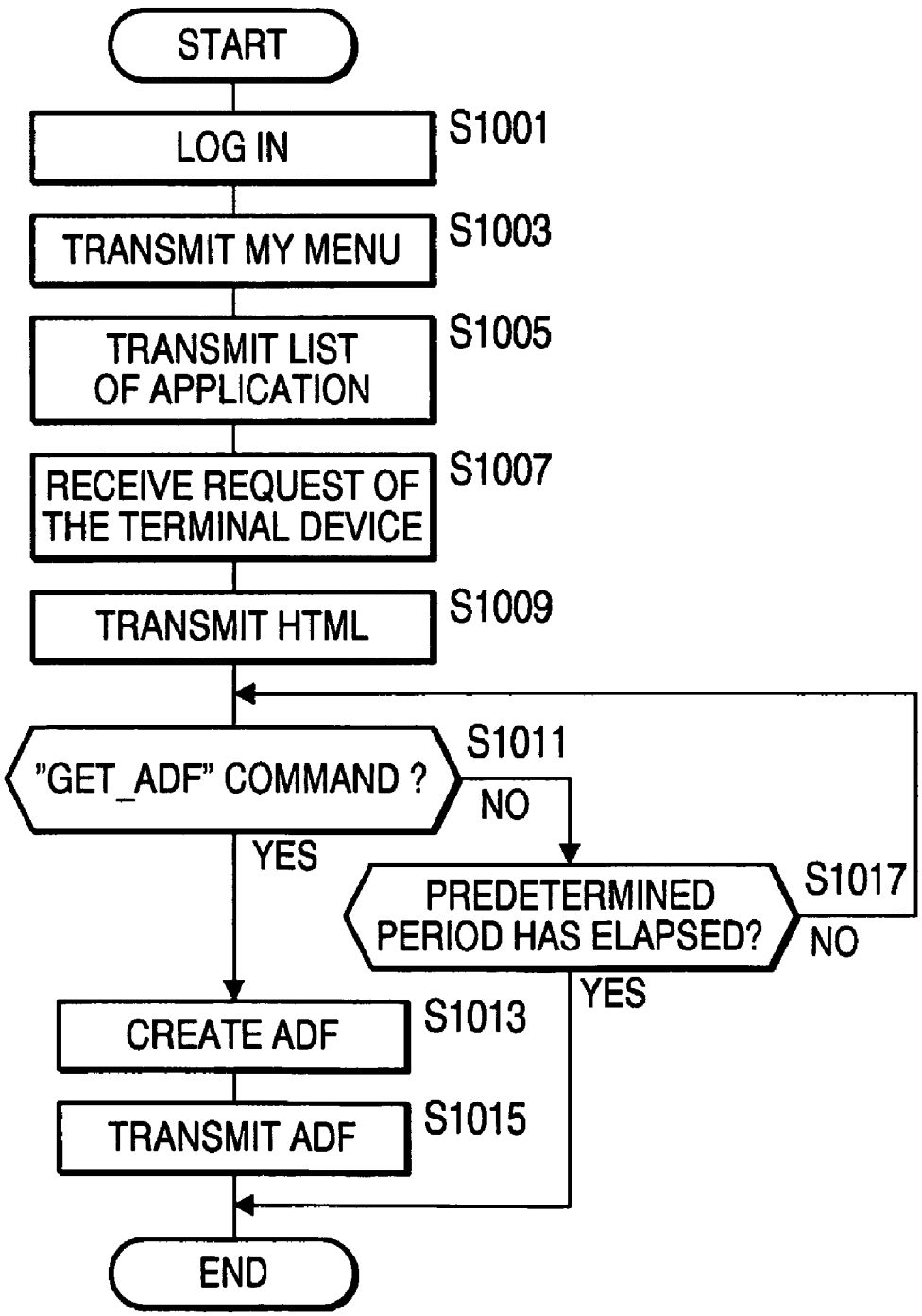
FIG. 30 is a flowchart illustrating an operation of the management server when the type A retry procedure shown in FIG. 29 is performed.

FIG. 30 is a flowchart illustrating an operation of the management server when the type A retry procedure shown in FIG. 29 is performed.

In S1001, the management server accepts the logging in of the terminal device. Then, the management server transmits the MY MENU to the terminal device (S1003). Further, in S1005, the terminal device transmits a list of the applications (MY APPLICATIONs) to the terminal device.

In response to the request of the terminal device issued in 5911 of FIG. 29, the management server transmits the HTML file (S1009), and control proceeds to S1011. The steps S1011 through S1017 are similar to steps S819 through S825 of FIG. 28, and description thereof is omitted for the sake of brevity.

Figure 31:
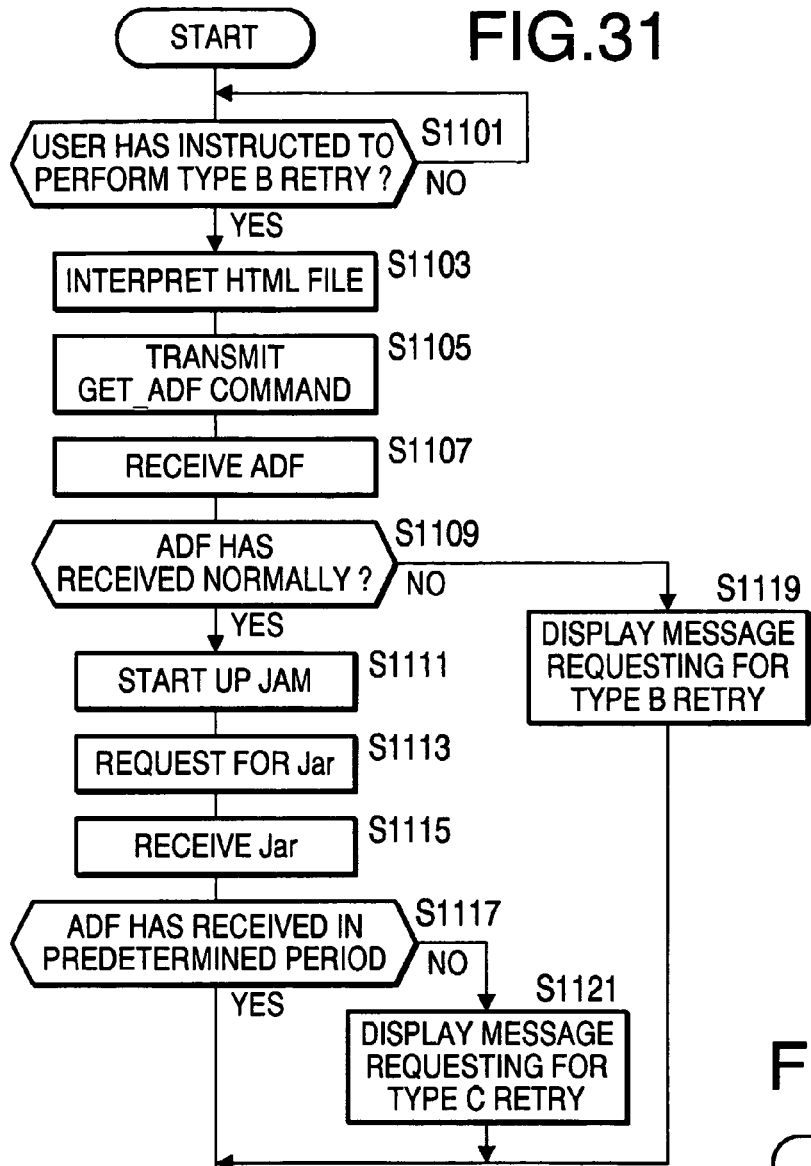
FIG. 31 is a flowchart illustrating a type B retry procedure according to the embodiment.

FIG. 31 is a flowchart illustrating the type B retry procedure. This procedure is executed when the terminal device has received the HTML file but it has not received the ADF. Since the HTML file has been received, the terminal device is capable of transmitting the "GET_ADF" command embedded in the HTML file.

In S1101, it is judged whether the user has instructed to perform the type B retry procedure. As described above, when the terminal device needs to download the ADF, the message indicating the necessity of the ADF is displayed (see S743 of FIG. 27, S935 of FIG. 29). When the message is displayed, a button for instructing the request for the ADF, the user may be able to request the ADF immediately. Of course the invention is not limited to such a configuration, and the instruction may be input to the terminal device in various ways.

When the user inputs the instruction to transmits the request for the ADF (S1101: YES), the terminal device interprets the HTML file having been received (S1103).

Steps S1103 through S1121 in FIG. 31 are similar to steps S917 through S937 of FIG. 29, and therefore, will not be repeated for the sake of brevity.

Figure 32:
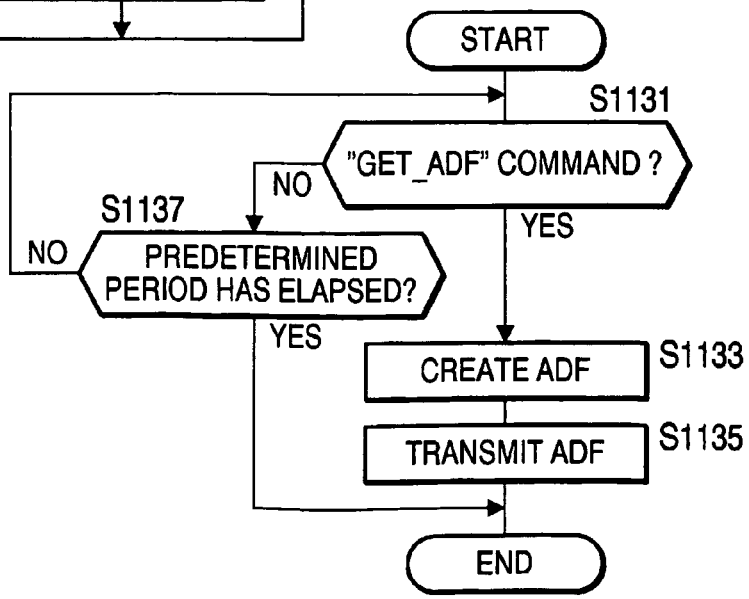
FIG. 32 is a flowchart illustrating an operation of the management server which is executed when the procedure shown in FIG. 31 is executed in the terminal device.

FIG. 32 is a flowchart illustrating an operation of the management server executed when the procedure shown in FIG. 31 is executed in the terminal device. It should be noted that steps S1131 through S1137 of FIG. 32 are similar to S1011 through S1017 of FIG. 30, and therefore, description thereof will be omitted.

Figure 33:
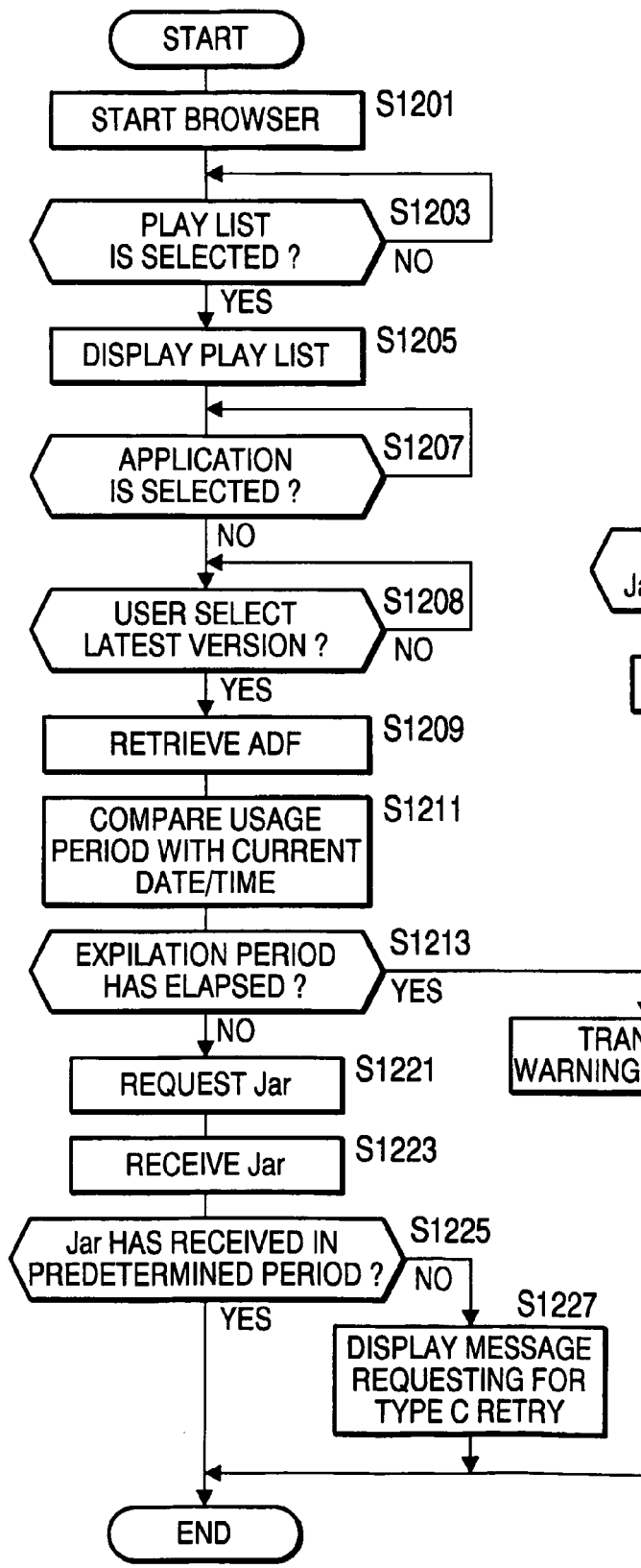
FIG. 33 shows a flowchart illustrating a type C retry procedure executed in the terminal device.

FIG. 33 shows a flowchart illustrating the type C retry procedure executed in the terminal device. When this procedure is executed, the ADF has been received, and only a Jar file is missing. That is, the procedure shown in FIG. 33 is a retry of the third phase procedure.

The user starts the browser in S1201. Then, the user selects a PLAY LIST from the menu (S1203). When the PLAY LIST menu is selected (S1203: YES), the terminal device displays the PLAY LIST on the display device thereof (S1205) (see FIGS. 18A, 18B, 19A and 19B), and waits until the user selects an application. In this case, it is assumed that, for the selected application, the ADF has been downloaded but the main body of the application (e.g., the Java file) has not been successfully downloaded. When the user selects the application (S1207: YES) and the user selects the "LATEST VERSION" from among the menu items (S1208: YES), control proceeds to S1209.

In S1209, the ADF is retrieved, the JAM is started and the expiration date/time calculated from the usage period data included in the ADF and the current date/time are compared (S1213).

If the expiration date/time has elapsed (S1213: YES), a warning message indicating that the user cannot download the file due to expiration of the term (S1215), and the procedure is terminated.

If the usage period has not expired (S1213: NO), control proceeds to S1221. Steps S1221 through S1227 are similar to steps S727 through S731 and S745, respectively. Therefore, the description thereof will be omitted.

It should be noted that, in the flowchart shown in FIG. 33, the latest version of the application is downloaded. This can be performed even if the terminal device has a previous version. Further, the judgment of the expiration period at S1213 is necessary when the user of the terminal device executes the type C retry procedure for updating the application. However, if the type C retry procedure is performed because the downloading of the Jar file has failed due to the communication error or the like, and is not intended to updating of the application, the checking process for the expiration period in S1211 and S1213 may be skipped.

In the above-described procedure of FIG. 33, the Jar file is downloaded in response to the user's explicit instruction to download the Jar file. This can be modified such that the download of the Jar file is started automatically when the application is selected from the list but the main body of the application has not downloaded.

Figure 34:
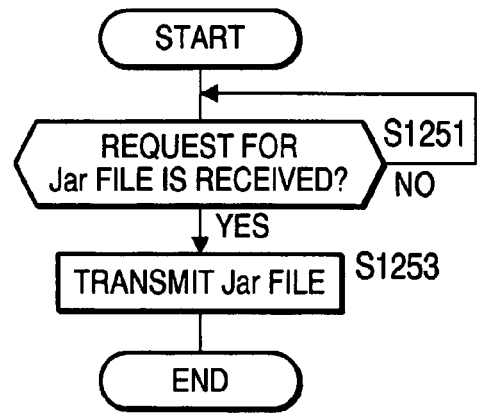
FIG. 34 is a flowchart illustrating an operation of the download site corresponding to the type C retry procedure.

FIG. 34 is a flowchart illustrating an operation of the download site corresponding to the type C retry procedure. When the download site receives the request for the Jar file (S1251: YES), it transmits the requested Jar file (S1253).

Figure 35:
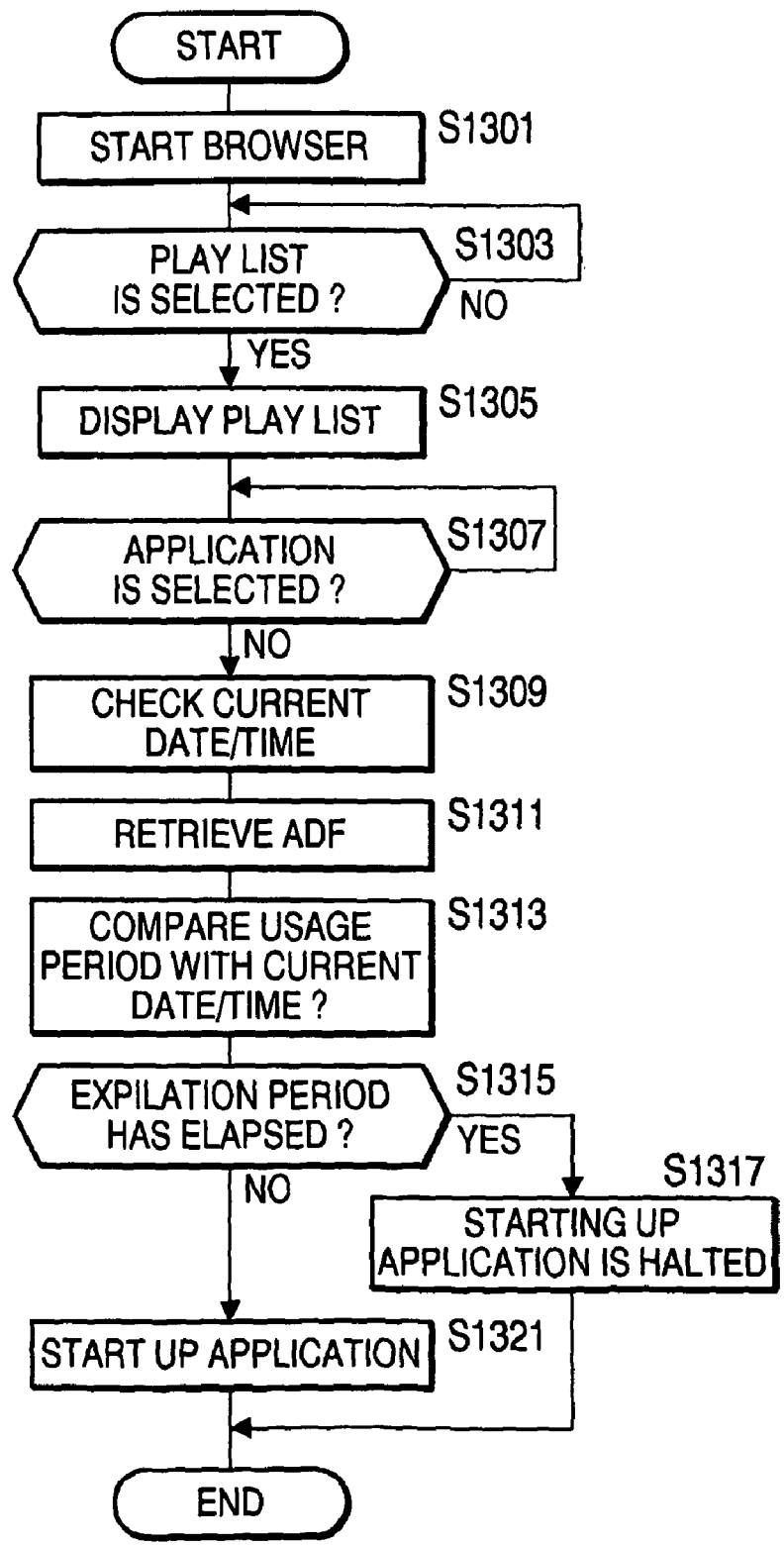
FIG. 35 is a flowchart illustrating a procedure when an application having been downloaded is executed in the terminal device.

FIG. 35 is a flowchart illustrating a procedure when an application having been downloaded is executed in the terminal device.

The user starts the browser (S1301), and selects the PLAY LIST menu (S1303: YES). Then, the PLAY LIST indicating the list of downloaded applications is displayed (S1305). The user selects an application from the list (S1307: YES). Then, the terminal device checks the current date/time (S1309), and then retrieves the ADF (S1311). In 1313, the expiration date/time calculated from the usage period data included in the ADF and the current date/time are compared.

If the expiration date/time has elapsed (S1315:YES), starting up of the application is halted (S1317). If the usage period has not expired (S1315: NO), the application is started up (S1321).

Figure 17:
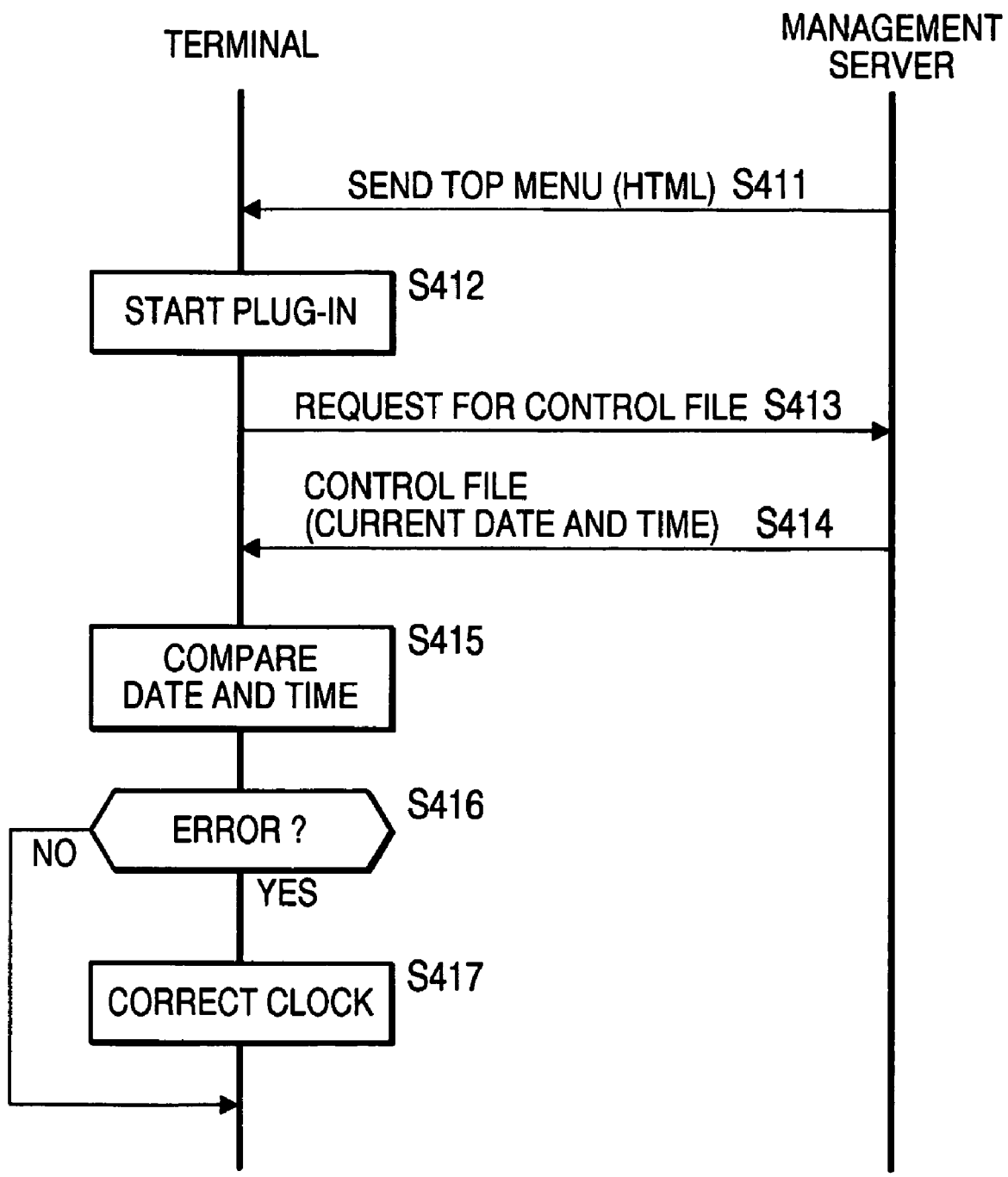
FIG. 17 shows a sequence for correcting a built-in clock of the user terminal.

FIG. 17 shows a sequence for correcting a built-in clock of the user terminal. The procedure is executed when the terminal device connects the management server to log in.

When the management server transmits HTML files such as the top menu (S411), incorporates a specific MIME type script in the HTML file. The browser of the terminal device starts up a predetermined plug-in in accordance with the MIME type script (S412). The plug-in requests the management server for a predetermined control file (S413). In response to the request, the management server transmits the control file including current date and time to the terminal device (S414). The plug-in of the terminal device compares the received date and time with the date and time of the internal clock (S415). If the internal clock has error of predetermined time interval (e.g., not less that five minutes), then it is judged that the internal clock has an error, and the internal clock is corrected to coincide with the date and time transmitted from the management server (S417). Optionally or alternatively, the control file may include a URL of a next page when the internal clock is correct and/or a URL of an error page when the internal clock is incorrect.

Instead of using the MIME type script, an enhanced tag such as <embed src="Getclock.cgi"> is incorporated, and the terminal browser is configured to interpret the tag and request for the control file including the current date and time.

Figure 18A:
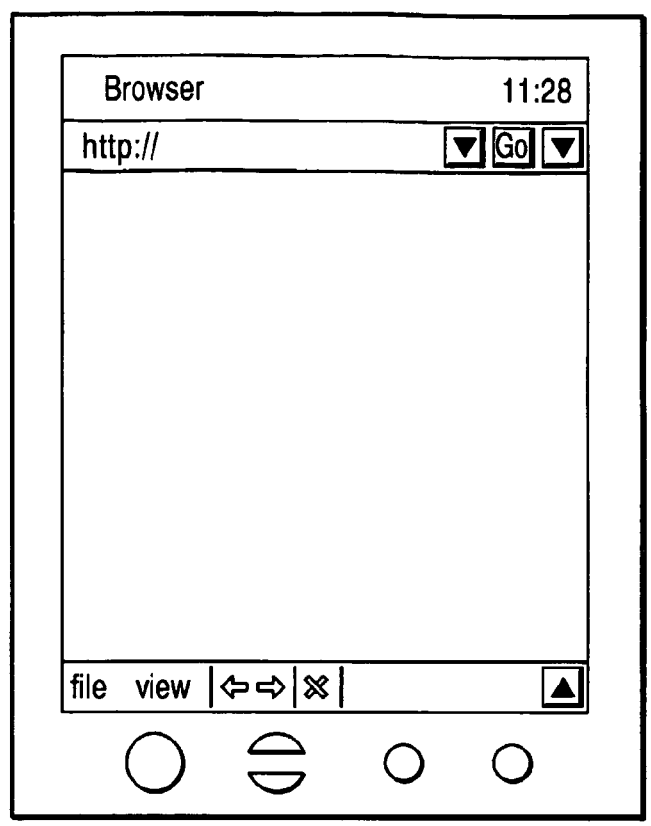
FIG. 18A shows an appearance of the user terminal and FIG. 18B shows a menu when the user terminal is in an off-line status.
Figure 18B:
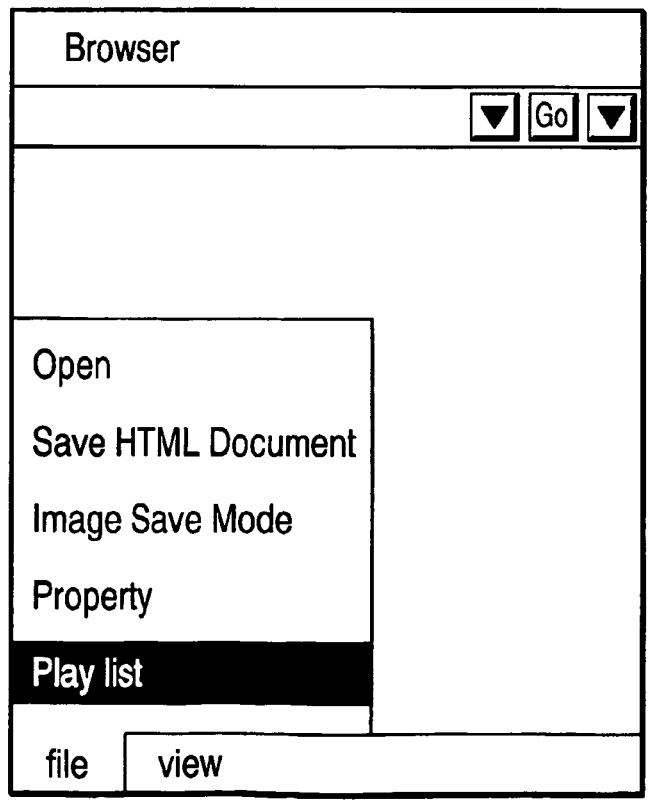

FIG. 18A shows an appearance of the user terminal, and FIG. 18B shows a menu when the user terminal is in an off-line status.

Figure 19A:
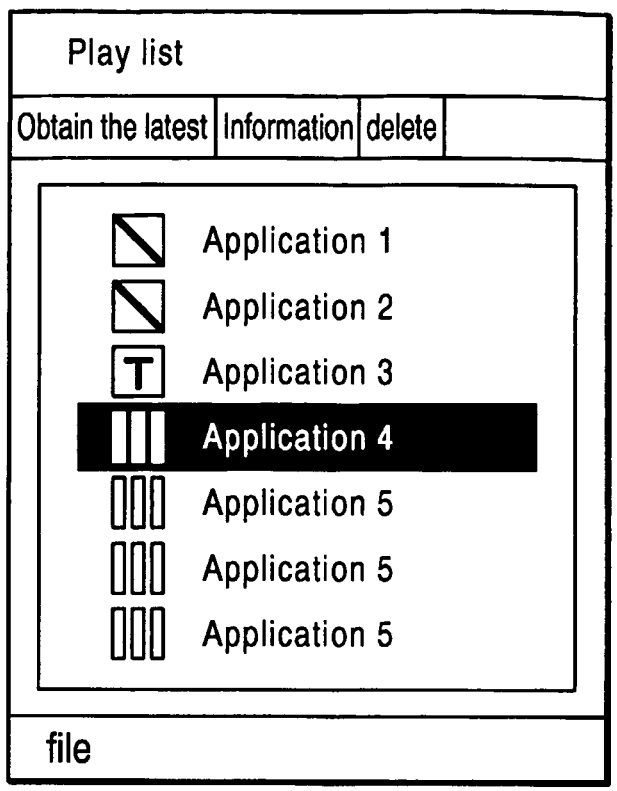
FIGS. 19A and 19B shows screen images of a play list and icons indicating information related to expiration of the applications, respectively.

When the user selects the play list from the menu, the play list as shown in FIG. 19A is displayed on the screen of the terminal device. The play list shows applications currently stored in the local storage of the terminal device. To each application, an attribution mark (icon) indicative of attribution regarding the expiration period is assigned and displayed.

Figure 19B:
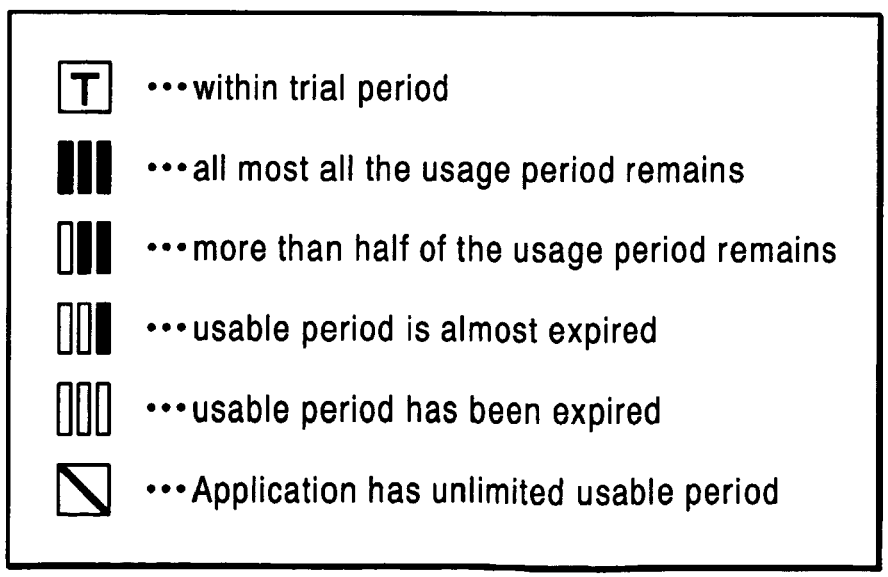

FIG. 19B shows five icons according to the embodiment. Icon 81 represents that the application is within a trial period. Icons 82-85 represent remainder of the usable period in stepwise manner. Specifically, icon 82 shows that almost all the usage period remains. Icon 83 shows the remaining period is more than half of the usable period. Icon 84 represents that the usable period is almost expired. Icon 85 represents that the usable period has been expired. Icon 86 indicates that the application has unlimited usable period.

The usage period indicated by the icon 81 is generally short, and the period indicated by the icon 86 is indefinite. In each case, it could be said that the icon indicates status of the expiration period. With use of such a graphical indication using icons, the user can recognize the expiration status quickly. As described above, according to the embodiment, based on the usage period attribution described in the ADF, the remaining period is calculated, and the result is indicated by the icons.

Figure 23:
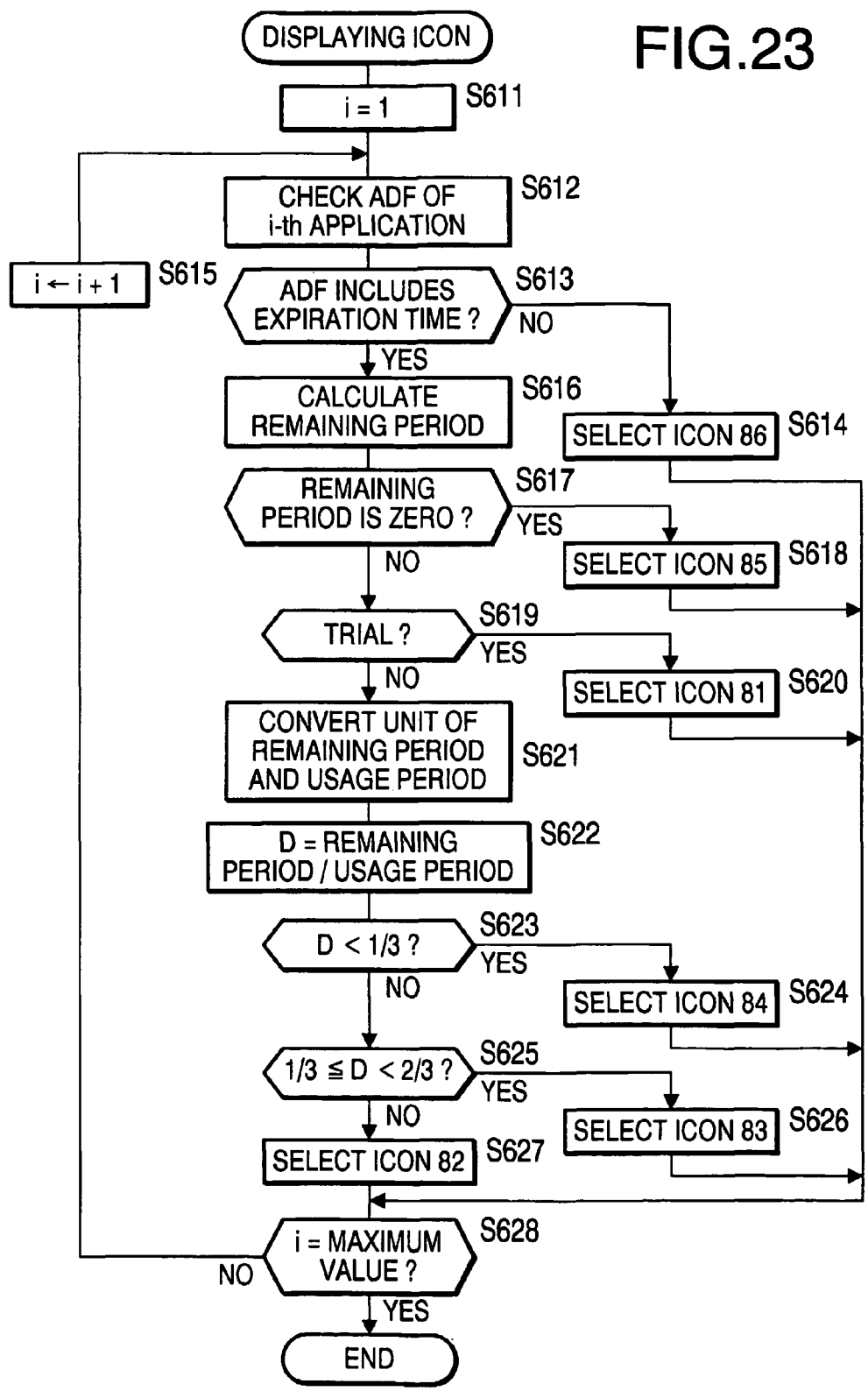
FIG. 23 is a flowchart illustrating a procedure of displaying the icons shown in FIG. 19B.

FIG. 23 is a flowchart illustrating a procedure of displaying the icons shown in FIGS. 19A and 19B. This procedure is a part of the procedures executed when the play list is displayed. Firstly, a variable i is initialized to have a value 1 (S611), and the following processes are repeated by the number of the applications. In 5612, the ADF of the i-th application is checked (S612). Then, it is examined whether the ADF includes an expiration time (S613). If the expiration time is not included in the ADF, the application does not have expiration period, i.e., the due date of the application is indefinite, the icon 86 is selected (S614). Then, it is judged whether the last application has been examined. If the last application has been examined, the procedure is terminated. If the last application has not yet been examined, the variable i is incremented by one (S615), and control returns to S612. If it is judged in S613 that the usage period is included, based on the usage period and current date and time, the remaining period is calculated (S616). If the remaining period is zero (or negative) (S617), the icon 85 is selected (S618) and controls proceeds to S628. If there is remaining time, it is judged whether the character string "trial" is added to the usage period "Expiration-time" (S619). If the character string is added, the application is used for trial. In such a case, the icon 81 is selected (S620), and control proceeds to S628. If the application is not used for trial, a unit of remaining period and usage period is converted (S621). For example, the period expressed by a unit of day is converted into minute unit (e.g., second). The conversion of the unit may be omitted. However, by doing this conversion, the remaining period can be classified accurately. Next, the quotient D of the remaining period divided by the usage period is obtained (S622). The value (quotient) D represents a ratio of the remaining period to the usage period. If D is less than ⅓ (S622), the icon 84 is selected (S624). If D is less than ⅔ but not less than ⅓ (S625), the icon 83 is selected (S626). Otherwise (i.e., D is not less than ⅔), the icon 82 is selected (S627). The procedure described above is repeated until the value of i becomes the maximum value (S628).

For each application in the play list shown in FIG. 20A, terminal device information, such as the member ID, the type ID and the name of the terminal device, can be checked as shown in FIG. 20B, or as shown in FIG. 20C, detailed information of the application, such as the name of the application, the version and the size of the application, can be checked. Further, as shown in FIG. 20D, the expiration period of the application can be checked. In FIG. 20D, the expiration period is indicated by year, month and date. This can be modified such that, for example, time is also indicated in addition to the date.

In order to use the limited storage capacity of the terminal device, the user is allowed to delete desired applications in the play list. In this case, the corresponding ADFs are also deleted. It should be noted that, in the "MY MENU" in the management server, the applications are kept registered as my applications. Therefore, even if the user deletes the purchased applications and the usage period has not expired, the user can download the application as well as the ADF from the management server for free within the usage period. The same applies to applications whose main body or the corresponding ADF is broken.

Figure 21:
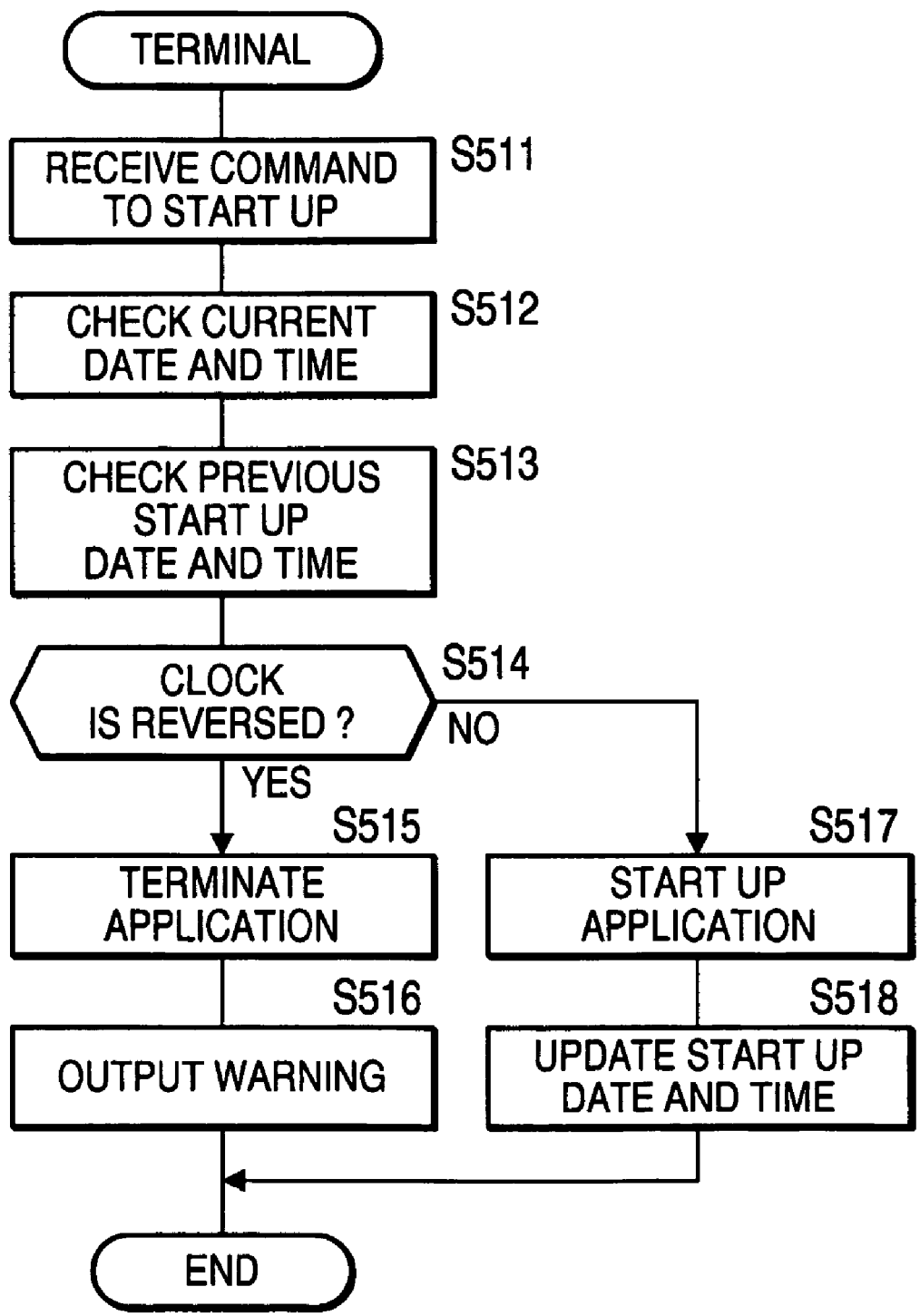
FIG. 21 is a flowchart illustrating a clock check procedure which is executed by the application when it is executed.

FIG. 21 is a flowchart illustrating a clock check procedure which is executed when the application is executed. As aforementioned, the internal clock is made to coincide with the clock of the management server. However, an ill-willed user might intentionally reverse the internal clock after the usage period has expired and falsely use the pay application. According to the invention, when the application is started up, the start up date and time are compared with the previous start up date and time. If the clock is reversed, the application is terminated.

In FIG. 21, when the terminal device (JAM) is operated by the user to start up an application in the play list (S511), firstly the current date and time are checked (S512). Then, the previous start-up date and time, which are stored in the terminal device, are checked (S513). When the application is executed first time, the previous start-up date and time are set to the date and time when the ADF file corresponding to the application was downloaded from the management server. The dates and times are compared (S514), and if the current start up date and time is older than the previous start up date and time, it is judged that the clock is reversed, and the application is terminated (S515). With this control, the ploy of reversing the internal clock to keep using the application is prevented. It should be noted that, a reversal of the clock in the order of some minutes may be allowed when the dates and times are compared since such a reversal might well occur when the clock is adjusted.

When the application is not started due to the reversal of the clock, a warning message indicates that the application has not started due to reversed clock (S516).

If it is judged that the clock is not reversed (S517), the current date and time are stored as the previous start-up date and time.

Figure 22:
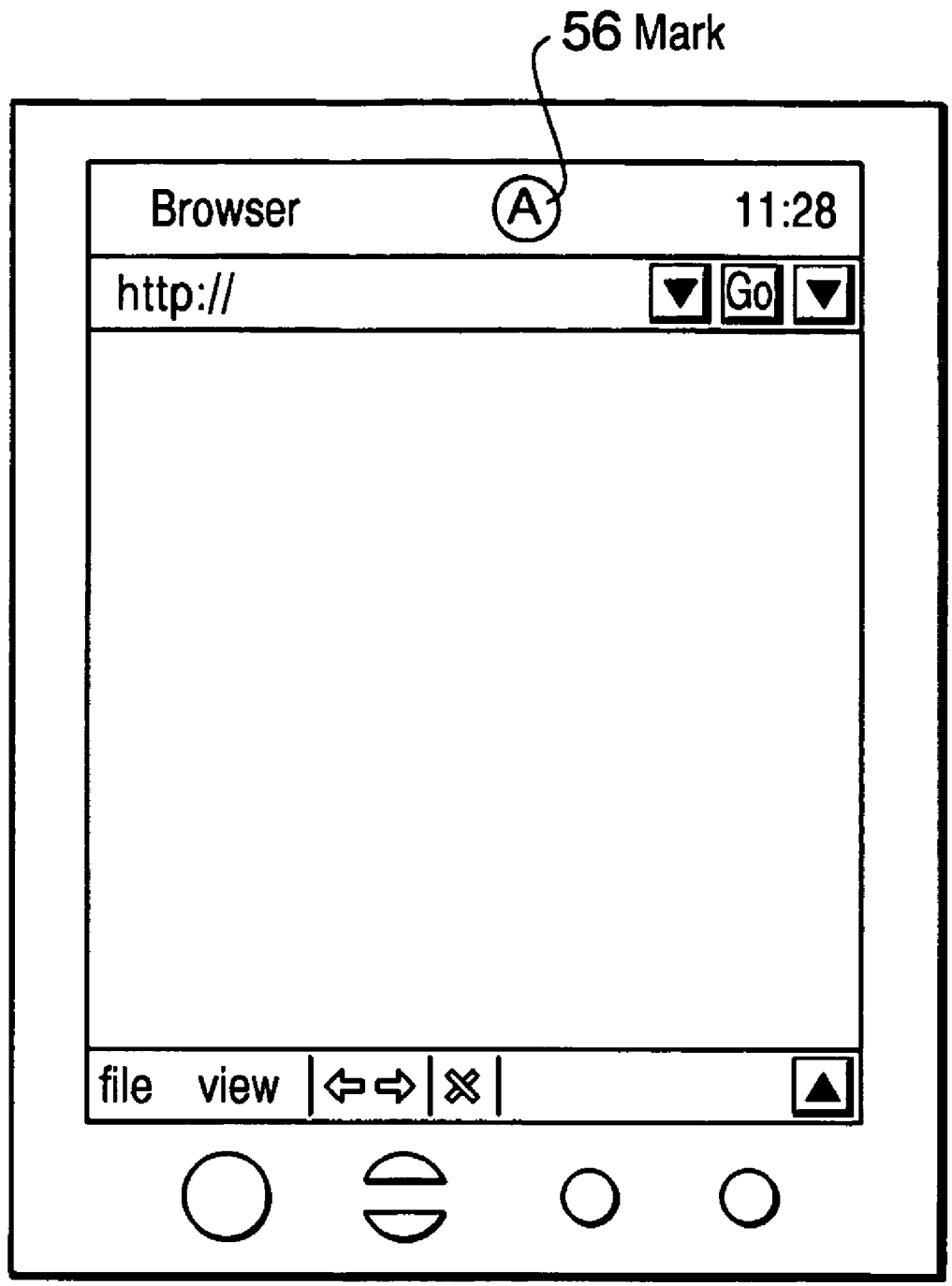
FIG. 22 is an exemplary screen image of the user terminal when icons are displayed.

FIG. 22 is an exemplary screen image of the terminal device in which a mark (icon) 56 is displayed. The mark 56 indicates that an application providing environment that allows the terminal device to use the services provided by the management server is installed in the terminal device. Such an application is typically a browser implemented with the above-described expiration period management function.

As aforementioned, the services provided through the network system may be used in some terminal devices, and may not be used in some other terminal devices. If the mark 56 is displayed, the user can easily recognize that the terminal device is capable of using the services. Optionally, the mark 56 may be configured to function as an icon for initiating a certain procedure. For example, the mark 56 may be used as an icon for displaying the play list, connecting the portal site to log in and display the MY MENU, or the like. It should be noted that the design of the icon, displayed position thereof, and the entire image including the image of the icon are not limited to those shown in the drawing, and various modification can be used.

Hereinafter, the storage service server 420 and print service server 420 shown in FIG. 1 will be described.

The storage service server 420 provides a service of leasing a storage area for the users of the terminal devices. Thus, it the uses the storage service, the storage capacity of the terminal device is substantially enlarged. Similarly to a case of the applications, the period of lease may be restricted. In order to use the storage service, the user may be download a dedicated application and/or data related to the usage of the storage service.

The print service server 430 provides a service of receiving data from the user and printing documents or the like. Specifically, the print server is provided with an application for processing image data such as data of images captured by a digital camera. The user places an order of printing with the management server, which bills the user regarding the printing service. The user, then, transmits the image data to the management server or other predetermined server to request printing. Then, the user may receive the printout at a predetermined place, for example, at a counter of a chain store. It should be noted that for the network services as described above, instead of the application URL in the ADF, a service URL of a site providing the network service may be used.

As described above, the embodiment provides advantages as indicated below.

(1) According to the embodiment, a usage period attribution indicative of the usage period of an application or the like is created by the server side and transmitted to the terminal device separately from the application. The usage of the application, downloading of the application and the like are controlled in accordance with the usage period attribution. Therefore, it becomes unnecessary to incorporate the "time bomb" in the application, and still it is possible to set the desired usage period of the application.

(2) The internal clock of the terminal device is automatically adjusted to coincide with the clock of the server. Therefore, the usage period can be managed based on the same clock both in the server and the terminal device.

(3) In the terminal device, even if the application is started up locally, the usage period of the application can be managed.

(4) Since the usage period can be managed in the terminal device, it is unnecessary to connect the server to check whether the usage period is expired. Therefore, a troublesome procedure for connecting with the server can be avoided, and unnecessary communication expense will not occur.

(5) The usage period attribution is generated every time when there is a bargain (i.e., trial, lease and the like). Therefore, the usage period can be set flexibly, and is not necessarily a fixed period. In a particular case, the usage period may be changed at every bargain or application.

(6) The main body of the application can be obtained any time within the usage period and by any number of times from an external server or the like without being billed therefor. Accordingly, even though the local storage has a limited capacity, the user can arbitrarily delete the application from the terminal device, and download the same from outside.

(7) According to the embodiment, when the user is billed for purchase of the application, only data (ADF) having a small size is transmitted from the management server to the terminal device, and the application itself is not transmitted to the terminal device at this stage. This ensures that the billing procedure is executed smoothly and without being interrupted due to communication errors or the like. This can be achieved since the downloading of the application can be done repeatedly after the billing procedure. This configuration reduces the burden to the management server significantly, since the management server need not check whether the application has been successfully downloaded.

(8) According to the embodiment, the usage period can be done relatively accurately. Therefore, even though the usage period is very short (e.g., one day, one hour and the like), the application or the like can be leased while maintaining economic effectiveness.

(9) The status regarding the usage/expiration period for each application the user has downloaded is displayed on the display screen of the terminal device. Therefore, the user can make a decision on updating of the usage period for each application. In particular, the usage/expiration status is indicated by means of a mark (or icon), the user can recognize the status intuitively. Thus, for the user of the terminal device, the operability is improved. Further, for the vender, by indicating the remaining usage period graphically, it is possible to motivate the user to extend the usage period.

(10) In the management server, applications subject to lease and/or trial are managed on the user basis. Therefore, if application information (i.e., ADF) is lost on the terminal device side, it is possible to recover the information based on the data stored in the management server.

(11) When a member is registered, a member ID is assigned, and further, a terminal ID for identifying the terminal used for receive the service is also assigned. The IDs are stored in the terminal device, and the terminal ID is hidden from the user (i.e., the user cannot know the terminal ID). When the user logs on, the management server checks the terminal ID as well as the member ID and the password. With this configuration, it becomes possible to prevent a non-member of the service from pretending to be a member of the service.

(12) Since the type ID is checked when the user logs on, the terminal devices capable of using the service can be restricted to predetermined ones (e.g., non-PC terminals excluding PCs). With this configuration, unauthorized readout of the terminal ID can be prevented, or unauthorized copying of the downloaded applications can be prevented.

(13) If a member registers a plurality of terminal devices for the services, different terminal IDs are assigned to different terminal devices, respectively. With this configuration, an attempt of a plurality of users trying to use the same pay application under one member name is prevented.

(14) Since each terminal device has a name, it is possible to identify the terminal device by the name in a recovery procedure. That is, when a terminal device is broken and replaced with another one, although the terminal ID has been changed, the terminal device can be identified by the name, and the recovery can be completed.

It will be appreciated by persons skilled in the art that the present invention is not limited to what has been particularly shown and described hereinabove. Rather, it is appreciated that the above-described embodiment can be modified in various ways without departing from the gist of the invention.

For example, according to the above-described embodiment, when the usage period has expired, the startup of the application is restricted. This may be interpreted such that the startup of the application is prohibited, functions of the application is partially disabled, or the application may be executed but a warning message such as "SAMPLE" or "EXPIRED" may be overlapped on the application screen.

Instead of providing a portal site, a stationary information processing apparatus installed in a storefront can be provided. An example of such an information processing apparatus is a multimedia kiosk, UBIQUITOUS NETWORK, Nomura Research Institute, Ltd., Dec. 20, 2000, published by Nomura Research Institute, Ltd. If such an apparatus is further provided with billing system such as a vending machine, it may be possible to collect fees by cash or credit card. In this case, communication between the terminal device of a user and the multimedia kiosk may be performed through infrared light communication, Bluetooth® and the like, which is applicable for communication in a short range.

In the embodiment, the expiration data (and time) is calculated by the management server and incorporated in the ADF file. However, the invention need not be limited to such a configuration, and can be modified, for example, such that the starting point (date and time) and the usage period are incorporated in the ADF file, and the expiration date/time may be calculated at the terminal device side.

In the above-described embodiment, the clock of the terminal device is forcibly synchronized with the clock of the management server. However, the invention is not limited to such a configuration, and the clock of the terminal device may be synchronized with another server. Alternatively, the clock of the terminal device may be adjusted in any appropriate way if the accuracy of the clock of the terminal device is guaranteed. It is stressed that the clock of the terminal device and the clock of the management server should be substantially synchronized in order to manage the expiration date and time based on the same clock.

In the above-described embodiment, the terminal device is explained as a non-PC terminal device. If a non-PC terminal has an appropriate security function, the present invention can properly be applied to such a non-PC terminal. Thus, any device (e.g., a network terminal device) which is capable of performing bi-directional data exchange with respect to the management server, another terminal device and the like can be used as the terminal device of the management system. In a particular case, the terminal device may be a terminal emulator (i.e., a combination of a browser running on a PC and the Java VM) that emulates the terminal device.

The communication protocol need not be limited to the above-described one, and any protocol can be used if it does not prevent the above-described management procedures.

In the embodiment, the applications and the like are downloaded through a network. The invention need not be limited to such a system, and the applications may be distributed by broadcasting through a broadcasting network such as a digital broadcasting.

In the embodiment, the same application is subject to downloading and purchasing. This may be modified such that, for example, the functions of the trial version are partially restricted.

In the embodiment, the user initially uses an application for trial, and then he/she purchases the same if he/she determines to purchase the application. It is apparent that, if the user desires, the trial steps may be skipped.

In the embodiment, the application is executed locally (i.e., with the terminal device disconnected from the network). However, the invention is not limited to such a configuration, and the terminal device may be connected to the network during a part of or entire execution of the application, as in a matching game.

In the embodiment, for one application, one usage period (a unit period) is assigned. However, the invention is not limited to such a configuration, and a plurality of usage periods (i.e., a plurality of kinds of unit periods) may be provided for user's choice. In such a case, the billing should also be changed depending on the user's selected period.

In the embodiment, the information regarding the remaining usage period is indicated by icon for applications listed in the play list. This may be enhanced so that such information may be indicated for other services such as news service. Further, such indications may be provided as graphical indications such as icons.

Since the type ID is transmitted from the terminal device to the management server, it may be possible to provide an application suitable to the type of the terminal device. That is, the system may be configured such that a plurality of applications corresponding to different types of the terminal devices, and the most appropriate application may be provided to the terminal device. This may be achieved, for example, by having the user of the terminal device select one of the plurality of applications or by automatically providing an application corresponding to the type ID.

In the embodiment, the user inputs the name of the terminal device so that each of a plurality of terminal devices of a single user can be identified. This may be modified such that the name of each terminal device is determined at the management server. It should be noted that, when the name is used only for distinguishing the terminal devices with respect each other, any information such as a serial number may be used instead of the name.

The system and method according to the present invention can be realized when appropriate programs provided and executed by a personal computer or the like. Such programs may be stored in recording medium such as a flexible disk, CD-ROM, memory cards and the like and distributed. Alternatively or optionally, such programs can be distributed through networks such as the Internet.

The invention claimed is:

1. A method of managing downloading applications in a networking system including a terminal device and a managing server, comprising:
   providing a menu for listing applications to the terminal device, the applications are managed by the managing server and downloadable with the terminal device;
   receiving a request from the terminal device for downloading an application which was selected among the applications on the menu by a user of the terminal device;
   in response to the request, transmitting a HyperText Markup Language (HTML) file including an embedded command, the terminal device returning the embedded command to the managing server in response to receiving the HTML file;
   in response to receiving the embedded command from the terminal device, transmitting an application descriptor file to the terminal device, the application descriptor file including usage period data indicative of a period during which the application can be used in the terminal device; and
   creating a record of the selected application on the managing server when at least a part of the selected application data is downloaded and stored in the terminal device, the record is used on the managing server to update usage license of the selected application without re-downloading the selected application data to the terminal device if it has been stored in the terminal device.

2. The method according to claim 1, wherein at least a part of a network path between the terminal device and the managing server is a wireless communication line.

3. The method according to claim 1, further comprising registering an application to the menu on the managing server through a computer network.

4. The method according to claim 1, wherein the menu is corresponding to a number of application management records that include a Uniform Resource Locator (URL) from which the application can be downloaded by the terminal device.

5. The method according to claim 1, wherein the menu is corresponding to a number of application management records that include usage period.

6. The method according to claim 1, wherein the menu is corresponding to a number of application management records that include trial period.

7. The method according to claim 1, wherein the record corresponds to a membership identification (ID).

8. The method according to claim 1, wherein the menu has category hierarchy.

9. The method according to claim 1, wherein the record is used on the managing server to re-download the selected application to the terminal device during usage period or trial period of the selected application, if it has not been stored in the terminal device.

10. The method according to claim 9, wherein at least a part of a network path between the terminal device and the managing server is a wireless communication line.

11. The method according to claim 9, further comprising registering an application to the menu on the managing server through a computer network.

12. The method according to claim 9, wherein the menu is corresponding to a number of application management records that include a Uniform Resource Locator (URL) from which the application can be downloaded by the terminal device.

13. The method according to claim 9, wherein the menu is corresponding to a number of application management records that include usage period.

14. The method according to claim 9, wherein the menu is corresponding to a number of application management records that include trial period.

15. The method according to claim 9, wherein the record corresponds to a membership identification (ID).

16. The method according to claim 9, wherein the menu has category hierarchy.

17. An application management system for managing downloading applications in a networking system, the application management system comprising:
   a terminal device, the terminal device having a display; and
   a managing server, the managing server having a controller,
   wherein the managing sever controller receives a request from the terminal device for downloading an application which was selected among the applications on the menu by a user of the terminal device, managing server provides a menu for listing applications on the display of to the terminal device, the applications being managed by the managing sever and downloadable with the terminal
   wherein in response to the request, the managing server controller causes to transmit HyperText Markup Language (HTML) file including an embedded command, the terminal device returns the embedded command to the managing server in response to receiving the HTML file,
   wherein in response to receiving the embedded command from the terminal device, the managing server controller causes to transmit application descriptor file to the terminal device, the application descriptor file including usage period data indicative of a period during which the application can be used in the terminal device,
   wherein the managing server controller creates a record of the selected application when at least a part of the selected application data is downloaded and stored in the terminal device, and
   wherein the record is used by the managing server controller to update usage license of the selected application without re-downloading the selected application data to the terminal device if it has been stored in the terminal device.

18. The application management system according to claim 17, wherein at least a part of a network path between the terminal device and the managing server is a wireless communication line.

19. The application management system according to claim 17, wherein the managing server controller registers an application to the menu on the managing server, the application registered in the menu being transmitted by an application vender to the managing server through a computer network.

20. The application management system according to claim 17, wherein the menu is corresponding to a number of application management records that include a Uniform Resource Locator (URL) from which the application can be downloaded by the terminal device.

21. The application management system according to claim 17, wherein the menu is corresponding to a number of application management records that include usage period.

22. The application management system according to claim 17, wherein the menu is corresponding to a number of application management records that include trial period.

23. The application management system according to claim 17, wherein the record corresponds to a membership identification (ID).

24. The application management system according to claim 17, wherein the menu has category hierarchy.

25. The application management system according to claim 17, wherein the record is used by the managing server controller to re-download the selected application to the terminal device during usage period or trial period of the selected application, if it has not been stored in the terminal device.

26. The application management system according to claim 25, wherein at least a part of a network path between the terminal device and the managing server is a wireless communication line.

27. The application management system according to claim 25, wherein the managing server controller registers an application to the menu on the managing server, the application registered in the menu being transmitted by an application vender to the managing server through a computer network.

28. The application management system according to claim 25, wherein the menu is corresponding to a number of application management records that include a Uniform Resource Locator (URL) from which the application can be downloaded by the terminal device.

29. The application management system according to claim 25, wherein the menu is corresponding to a number of application management records that include usage period.

30. The application management system according to claim 25, wherein the menu is corresponding to a number of application management records that include trial period.

31. The application management system according to claim 25, wherein the record corresponds to a membership identification (ID).

32. The application management system according to claim 25, wherein the menu has category hierarchy.

33. A managing server for managing downloading applications in a networking system including a terminal device, the managing server having a controller,
   wherein the managing server controller provides a menu for listing applications to the terminal device, the applications being managed by the managing sever and downloadable with the terminal device,
   wherein the managing sever receives a request from the terminal device for downloading an application which was selected among the applications on the menu by a user of the terminal device,
   wherein in response to the request, the managing server controller causes to transmit HyperText Markup Language (HTML) an HTML file including an embedded command, the terminal device returns the embedded command to the managing server in response to receiving the HTML file,
   wherein in response to receiving the embedded command from the terminal device, the managing server controller causes to transmit application descriptor file to the terminal device, the application descriptor file including usage period data indicative of a period during which the application can be used in the terminal device,
   wherein the managing server controller creates a record of the selected application when at least a part of the selected application data is downloaded and stored in the terminal device, and
   wherein the record is used by the managing server controller to update usage license of the selected application without re-downloading the selected application data to the terminal device if it has been stored in the terminal device.

34. The managing server according g to claim 33, wherein at least a part of a network path between the terminal device and the managing server is a wireless communication line.

35. The managing server according to claim 33, wherein the managing server controller registers an application to the menu on the managing server, the application registered in the menu being transmitted by an application vender to the managing server through a computer network.

36. The managing server according to claim 33, wherein the menu is corresponding to a number of application management records that include a Uniform Resource Locator (URL) from which the application can be downloaded by the terminal device.

37. The managing server according to claim 33, wherein the menu is corresponding to a number of application management records that include usage period.

38. The managing server according to claim 33, wherein the menu is corresponding to a number of application management records that include trial period.

39. The managing server according to claim 33, wherein the record corresponds to a membership identification (ID).

40. The managing server according to claim 33, wherein the menu has category hierarchy.

41. The managing server according to claim 33, wherein the record is used by the managing server controller to re-download the selected application to the terminal device during usage period or trial period of the selected application, if it has not been stored on the terminal device.

42. The managing server according to claim 41, wherein at least a part of a network path between the terminal device and the managing server is a wireless communication line.

43. The managing server according to claim 41, wherein the managing server controller registers an application to the menu on the managing server, the application registered in the Menu being transmitted by an application vender to the managing server through a computer network.

44. The managing server according to claim 41, wherein the menu is corresponding to a number of application management records that include a Uniform Resource Locator (URL) from which the application can be downloaded by the terminal device.

45. The managing server according to claim 41, wherein the menu is corresponding to a number of application management records that include usage period.

46. The managing server according to claim 41, wherein the menu is corresponding to a number of application management records that include trial period.

47. The managing server according to claim 41, wherein the record corresponds to a membership identification (ID).

48. The managing server according to claim 41, wherein the menu has category hierarchy.

* * * * *